US012175573B2

(12) United States Patent
Choi

(10) Patent No.: US 12,175,573 B2
(45) Date of Patent: Dec. 24, 2024

(54) AUTOMATIC DESIGN-CREATING ARTIFICIAL NEURAL NETWORK DEVICE AND METHOD, USING UX-BITS

(71) Applicant: TINTOLAB CO., LTD, Seoul (KR)

(72) Inventor: Joon Yun Choi, Gwangju-si (KR)

(73) Assignee: TINTOLAB CO., LTD, Seoul (KR)

( * ) Notice: Subject to any disclaimer, the term of this patent is extended or adjusted under 35 U.S.C. 154(b) by 190 days.

(21) Appl. No.: 18/017,349

(22) PCT Filed: Apr. 15, 2022

(86) PCT No.: PCT/KR2022/005464
§ 371 (c)(1),
(2) Date: Jan. 20, 2023

(87) PCT Pub. No.: WO2022/255632
PCT Pub. Date: Dec. 8, 2022

(65) Prior Publication Data
US 2023/0351655 A1   Nov. 2, 2023

(30) Foreign Application Priority Data
May 31, 2021   (KR) ........................ 10-2021-0070403

(51) Int. Cl.
*G06T 11/60*   (2006.01)
*G06F 9/451*   (2018.01)
*G06T 3/4046*   (2024.01)

(52) U.S. Cl.
CPC .............. *G06T 11/60* (2013.01); *G06F 9/451* (2018.02); *G06T 3/4046* (2013.01)

(58) Field of Classification Search
CPC .......... G06T 11/60; G06T 3/4046; G06F 9/45
See application file for complete search history.

(56) References Cited

U.S. PATENT DOCUMENTS 6,477,580 B1 * 11/2002 Bowman-Amuah ..... G06F 9/54
709/236
2010/0083077 A1 * 4/2010 Paulsen .................. G11B 27/34
715/202

(Continued)

FOREIGN PATENT DOCUMENTS

JP         2019-523927 A    8/2019
KR   10-2019-0134967 A    12/2019

(Continued)

OTHER PUBLICATIONS

Gajjar, Nishit et al., "Akin: Generating UI Wireframes From UI Design Patterns Using Deep Learning", IUI' 21 Companion: 26th International Conference on Intelligent User Interfaces, Apr. 14, 2021, pp. 40-42.

*Primary Examiner* — Sing-Wai Wu
*Assistant Examiner* — Khoa Vu
(74) *Attorney, Agent, or Firm* — Bridgeway IP Law Group, PLLC; Sang Ho Lee; Hyun Woo Shin

(57) ABSTRACT

The present disclosure relates to a development project collaboration method using a UX-bit of a program such as an application used by customers and service providers. Specifically, the present disclosure relates to a development project collaboration method capable of reducing a development period and costs using a UX-bit such that elements constituting a project are easily searched for and applied. The development project collaboration method includes receiving a project goal, receiving detailed tasks for achieving the project goal, arranging content agreed upon in the project goal and the detailed tasks into UX-bits in an integrated function definition, combining the UX-bits based on the function definition and arranging information architecture (IA) elements, constituting a wireframe based on the IA elements, designing a configuration page based on the wireframe, providing a verification page for verifying the (Continued)

configuration page formed by combining the UX-bits, and when a modification occurs in at least one of the project goal, the detailed task, the UX-bit, the IA element, the wireframe, and the design, simultaneously modifying the project goal, the detailed task, the UX-bit, the IA element, the wireframe, and the design to which the modification is reflected in the entire project.

8 Claims, 26 Drawing Sheets

(56) References Cited

U.S. PATENT DOCUMENTS

| | | | | |
|---|---|---|---|---|
| 2018/0143741 | A1* | 5/2018 | Uriostegui | G06F 16/48 |
| 2019/0325066 | A1* | 10/2019 | Krishna | G06F 16/3347 |
| 2021/0117167 | A1* | 4/2021 | Huang | G06F 8/20 |
| 2021/0406673 | A1* | 12/2021 | Pardeshi | G06F 3/04815 |
| 2022/0100767 | A1* | 3/2022 | Ghoshal | G06F 40/279 |
| 2022/0108074 | A1* | 4/2022 | Kehler | G06F 18/22 |
| 2024/0104682 | A1* | 3/2024 | Kamath | G06T 11/20 |

FOREIGN PATENT DOCUMENTS

| | | |
|---|---|---|
| KR | 10-2095118 B1 | 4/2020 |
| KR | 10-2020-0108728 A | 9/2020 |
| KR | 10-2198545 B1 | 1/2021 |
| KR | 10-2213291 B1 | 2/2021 |
| KR | 10-2021-0038524 A | 4/2021 |
| KR | 10-2021-0041548 A | 4/2021 |
| KR | 10-2246537 B1 | 4/2021 |
| KR | 10-2251291 B1 | 5/2021 |
| KR | 10-2258004 B1 | 5/2021 |

* cited by examiner

TABLE IN WHICH UX-BIT LEVELS ARE CLASSIFIED IN DESIGN UNITS OF FUNCTIONAL UNITS

| | FUNCTION | DESIGN |
|---|---|---|
| LV.1 | WORD UNIT<br>CONCEPT | FORMATIVE ATTRIBUTE<br>TEXT, IMAGE, COLOR, SHAPE, SIZE |
| LV.2 | WORD COMBINATION<br>COMPLEX CONCEPT (COMPOUND WORD: WORD+WORD) | VALUE OF FORMATIVE ATTRIBUTE<br>TEXT_FONT, COLOR, SIZE, THICKNESS |
| LV.3 | GROUP OF CONCEPTS<br>CLASSIFICATION | COMBINATION OF ASSEMBLY ATTRIBUTE AND VALUE<br>GOAL |
| LV.4 | HIERARCHY<br>HIERARCHY BETWEEN CONCEPTS OR GROUPS | GROUP OF ATTRIBUTE COMBINATIONS<br>VISUAL STYLE (STYLE CREATED BY FORM) |
| LV.5 | AREA<br>CONCEPT+GROUP+HIERARCHY | DESIGN LANGUAGE<br>CONCEPT, ATMOSPHERE |
| LV.6 | SCREEN<br>AREA+TARGET+GOAL=WIREFRAME | SCREEN<br>PSD DESIGN FILE |
| LV.7 | CODE | PUBLISHING<br>HTML, CSS |
| LV.8 | COMPLETED SERVICE | |

FIG. 5

SELECT BOTTOM FIGURE    DRAG AND DROP    PRESS AND HOLD TO MODIFY/DELETE/COPY

AUTOMATIC DESIGN-CREATING ARTIFICIAL NEURAL NETWORK DEVICE AND METHOD, USING UX-BITS

TECHNICAL FIELD

The present disclosure relates to an automatic design generating artificial neural network device and method using a user experience (UX)-bit. Specifically, the present disclosure relates to a development project collaboration method in which, designs are automatically generated in response to input of elements constituting a graphic design project, e.g., a web, an application (app), or the like, thereby enabling reduction of development period and costs.

BACKGROUND ART

With the development of IT technology, the development of platforms applying information and communication technology and the introduction of e-commerce are becoming more active, and the number of companies, of which a business form is converted from offline to online or which add online channels in addition to existing offline businesses, is being increased.

In addition to the continuous expansion of the online business market, the demand for non-face-to-face related services is rapidly increasing due to the recent outbreak of coronavirus.

The development demand for software and user interface (UI)/user experience (UX) necessary for telecommuting and remote services is increasing, and the life cycle of UI/UX designs is rapidly changing due to the rapid flow of the times.

There is a need for UI/UX development tools that can respond to such rapid changes.

FIG. 1 is a diagram illustrating the performance of an existing project collaboration method. Referring to FIG. 1, such a UI/UX development system is applied by reflecting the development of technology and customer needs to newly develop or upgrade programs. In a process of developing a project, opinions are presented through meetings, and when agreement on a configuration of the project is reached through discussion, a function definition is prepared based on agreed content, and an information architecture (IA), a wireframe, a storyboard, and a design task are performed in order to perform publishing, and through an operation of developing programs, corresponding content is coded to open a service.

There are problems in that the UI/UX development system has a structure in which, in a project progress process, only when each of operations from agreement to programming development should be completed, a next operation may be performed, and since data in each operation is observed independently, task resources and time requirements are inevitably incurred.

Therefore, there is a need to improve a process in order to reduce such task resources and time requirements.

DISCLOSURE

Technical Problem

Therefore, in order to solve the above problems, the present disclosure is directed to provide a method capable of concurrently agreeing on a plurality of operations and collectively performing the operations by making a function definition, an information architecture (IA), a wireframe, a storyboard, and a design, etc. into UX-bits that can be easily selected, applied, and combined.

The present disclosure is also directed to provide an automatic design generating artificial neural network device and method which automatically outputs a design when elements are input in order to reduce a development period and development costs.

Technical Solution

Hereinafter, specific means for achieving the object of the present disclosure will be described.

In order to solve the above problems, a development project collaboration method according to one embodiment of the present disclosure includes receiving a project goal, receiving detailed tasks for achieving the project goal, arranging content agreed upon in the project goal and the detailed tasks into UX-bits in an integrated function definition, combining the UX-bits based on the function definition and arranging information architecture (IA) elements, constituting a wireframe based on the IA elements, designing a configuration page based on the wireframe, providing a verification page for verifying the configuration page formed by combining the UX-bits, and when a modification occurs in at least one of the project goal, the detailed task, the UX-bit, the IA element, the wireframe, and the design, simultaneously modifying the project goal, the detailed task, the UX-bit, the IA element, the wireframe, and the design to which the modification is reflected in the entire project.

According to one embodiment of the present disclosure, the UX-bits may include function UX-bits and design UX-bits of which levels are classified into a plurality of levels.

According to one embodiment of the present disclosure, levels of the function UX-bit may be classified into level 1 including a word unit, level 2 including a word combination, level 3 including a group of concepts, level 4 including hierarchy information, level 5 including area information, level 6 including screen information, level 7 including a code, and level 8 including a completed service.

According to one embodiment of the present disclosure, levels of the design UX-bit may include level 1 including a formative attribute, level 2 including a value of a formative attribute, level 3 including a combination of a formative attribute and a value, level 4 including a group of attribute combinations, level 5 including a design language, level 6 including screen information, and level 7 including publishing information.

According to one embodiment of the present disclosure, the arranging of the IA elements may include presenting at least one IA option based on the function definition and providing an edit page for editing a position and a connection relationship of the IA elements.

According to one embodiment of the present disclosure, the providing of the edit page may include arranging the dragged and dropped IA elements, connecting the arranged IA elements with lines according to levels or hierarchies, and modifying the arranged and connected IA elements according to a practitioner's choice.

According to one embodiment of the present disclosure, the constituting of the wireframe may include presenting a plurality of wireframe layouts based on the arranged and connected IA elements, and selecting and customizing the wireframe layouts by reflecting a practitioner's choice.

According to one embodiment of the present disclosure, the constituting of the wireframe may include reflecting a change in arrangement of the IA elements, which is caused by selecting and customizing a wireframe layout, on the arranged and connected IA elements.

According to one embodiment of the present disclosure, the designing of the configuration page may include presenting a design option in order of design UX-bit levels, and modifying the design option by reflecting a practitioner's choice.

According to one embodiment of the present disclosure, the providing of the verification page formed by combining the UX-bits may include applying and outputting a design to the selected and customized wireframe layout on the screen, and performing a simulation in the same environment as an actual user environment.

According to one embodiment of the present disclosure, the performing of the simulation in the same environment as the actual user environment may include outputting a controller on at least a portion of the screen, and implementing driving of the project according to an input of the practitioner input to the controller.

In order to solve the above problems, a development project collaboration program using a UX-bit according to one embodiment of the present disclosure includes commands that perform a development project collaboration method using a UX-bit which controls a screen defined by an operating system at predetermined intervals. The development project collaboration method using a UX-bit may include receiving a project goal, receiving detailed tasks for achieving the project goal, arranging content agreed upon in the project goal and the detailed tasks into UX-bits in an integrated function definition, combining the UX-bits based on the function definition and arranging IA elements, constituting a wireframe based on the IA elements, designing a configuration page based on the wireframe, providing a verification page for verifying the configuration page formed by combining the UX-bits, and when a modification occurs in at least one of the project goal, the detailed task, the UX-bit, the IA element, the wireframe, and the design, simultaneously modifying the project goal, the detailed task, the UX-bit, the IA element, the wireframe, and the design to which the modification is reflected in the entire project.

An object of the present disclosure may be achieved by providing an automatic design generating artificial neural network device using a user experience (UX)-bit including an image theme encoding module that is an encoding module which receives image theme data, which is an image representing a theme of a web/app graphic design to be generated by a practitioner, as input data, and outputs an image theme encoding vector as output data, a text theme encoding module that is an encoding module which receives text theme data, which is text representing the theme of the web/app graphic design to be generated by the practitioner, as input data, and outputs a text theme encoding vector as output data, a UX-bit generation module that is a module which receives the image theme encoding vector and the text theme encoding vector as input data and outputs UX-bit attributes of a plurality of UX elements as output data, a design generation module that is an upsampling artificial neural network module which receives the image theme encoding vector, the text theme encoding vector, and the UX-bit attribute as input data and outputs design data meaning a specific web/app graphic design as output data, an image theme discriminator that is a module used in a learning session of the design generation module and is a pre-learned artificial neural network module which, when the design data and the image theme data are input as input data, outputs an image theme discrimination vector, which means a probability of similarity between the design data and the image theme data, as output data, a text theme discriminator that is a module used in the learning session of the design generation module and is a pre-learned artificial neural network module which, when a design encoding vector that is an encoding vector of the design data and the text theme encoding vector are input as input data, outputs a text theme discrimination vector, which means a probability of similarity between the design encoding vector and the text theme encoding vector, as output data, and a UX-bit attribute discriminator that is a module used in the learning session of the design generation module and is a pre-learned artificial neural network module which, when the design encoding vector and an encoding vector of the UX-bit attribute are input as input data, outputs a UX-bit attribute discrimination vector, which means a probability of similarity between the design encoding vector and the encoding vector of the UX-bit attribute, as output data, wherein, in the learning session of the design generation module, parameters of the design generation module are updated in a direction in which a representative design loss, which is composed of a difference between the design data and web/app design reference data (ground truth) in which similarity with the image theme encoding vector and similarity with the text theme encoding vector are greater than or equal to a specific level in an 3encoding vector of a pre-stored web/app design corresponding thereto, an image theme discrimination loss including the image theme discrimination vector, a text theme discrimination loss including the text theme discrimination vector, and a UX-bit attribute determination loss including the UX-bit attribute discrimination are reduced.

The automatic design generating artificial neural network device may further include a nonlinear network which is connected to the design generation module, is a network having a nonlinear structure in which a plurality of fully connected (FC) layers are consecutively connected, and is a module which receives a concatenated vector obtained by concatenating the image theme encoding vector and the text theme encoding vector as input data, outputs a theme vector as output data, and inputs the output theme vector to a plurality of layers in a network of the design generation module for each scale, wherein, in the design generation module, the UX-bit attribute is input as input data, and a noise vector is input to each layer having a scale to which the theme vector is input.

The automatic design generating artificial neural network device may further include a common theme segment module which is connected to the image theme encoding module and is a module which receives the image theme data as input data and outputs common theme segment data as output data, wherein, in a learning session of the common theme segment module, parameters of the common theme segment module are updated in a direction in which similarity between the text theme encoding vector and the image theme encoding vector are increased.

The UX-bit attributes may include UX-bit function attributes and UX-bit design attributes, and the UX-bit generation module may include a UX element generation module that is a module which generates the plurality of the UX elements to match the UX-bit function attribute and the UX-bit design attribute with a specific UX element, and an recurrent neural network (RNN) module that is an artificial neural network module which outputs the UX-bit function attribute and the UX-bit design attribute for the UX element.

The UX-bit attributes may include UX-bit function attributes and UX-bit design attributes, and the UX-bit generation module may include a UX element generation module that is a module which generates the plurality of the UX elements to match the UX-bit function attribute and the UX-bit design attribute with a specific UX element, and an RNN module that is an artificial neural network module which outputs the UX-bit function attribute and the UX-bit design attribute for the UX element, wherein the RNN module includes RNN blocks including a first RNN cell and a second RNN cell as a basic unit, the image theme encoding vector and the text theme encoding vector are used as initial input data, the first RNN cell receives the initial input data or output data of a previous cell and RNN hidden layer information and outputs the UX-bit function attribute of an nth UX element, and the second RNN cell receives the UX-bit function attribute, which is the output data of the previous cell, and the RNN hidden layer information, and outputs the UX-bit design attribute for the UX-bit function attribute of the nth UX element output from the first RNN cell.

The UX-bit attributes may include UX-bit function attributes and UX-bit design attributes, and the UX-bit generation module may include a UX element generation module that is a module which generates the plurality of the UX elements to match the UX-bit function attribute and the UX-bit design attribute with a specific UX element, an RNN module that is an artificial neural network module which outputs the UX-bit function attribute and the UX-bit design attribute for the UX element, and a reinforcement learning module which is configured such that the UX-bit attributes of all pre-generated UX elements, the image theme encoding vector, and the text theme encoding vector are input as an environment, an RNN block of the RNN module is set as an agent, a situation, in which an $n_{th}$ UX element having the UX-bit function attributes and the UX-bit design attributes is virtually included in the UX-bit function attributes and the UX-bit design attributes of first to $(n-1)^{th}$ elements, is set as a state, in such a state, the UX-bit function attributes and the UX-bit design attributes output for the $n^{th}$ UX element by the RNN block, which is the agent, are input for an action, and as similarity is high between comparison information and the UX-bit function attributes and the UX-bit design attributes of the nth UX element which are output data, a relatively high reward is generated to update a hidden layer of the RNN block which is the agent, wherein the comparison information means a concatenation between the image theme encoding vector and the text theme encoding vector.

Another object of the present disclosure may be achieved by providing an automatic design generating artificial neural network method using a UX-bit including an image theme encoding operation of, by an image theme encoding module, receiving image theme data, which is an image representing a theme of a web/app graphic design to be generated by a practitioner, as input data, and outputting an image theme encoding vector as output data, a text theme encoding operation of, by a text theme encoding module, receiving text theme data, which is text representing the theme of the web/app graphic design to be generated by the practitioner, as input data, and outputting a text theme encoding vector as output data, a UX-bit generating operation of, by a UX-bit generation module, receiving the image theme encoding vector and the text theme encoding vector as input data and outputting UX-bit attributes of a plurality of UX elements as output data, and a design generating operation of, by a design generation module, receiving the image theme encoding vector, the text theme encoding vector, and the UX-bit attribute as input data and outputting design data meaning a specific web/app graphic design as output data, wherein, in a learning session of the design generation module, parameters of the design generation module are updated in a direction in which a representative design loss, which is composed of a difference between the design data and web/app design reference data (ground truth) in which similarity with the image theme encoding vector and similarity with the text theme encoding vector are greater than or equal to a specific level in a pre-stored web/app design corresponding thereto, an image theme discrimination loss including a discrimination difference between the image theme discrimination vector and the design data, a text theme discrimination loss including a discrimination difference between the text theme discrimination vector and the design data, and a UX-bit attribute discrimination loss including a discrimination difference between the design data and a UX-bit attribute discrimination vector and, which is a discrimination vector for the UX-bit attributes are reduced.

Still another object of the present disclosure may be achieved by providing an automatic design generating artificial neural network system including a practitioner client which receives image theme data that is an image representing a theme of a web/app graphic design to be generated by a practitioner and text theme data that is text representing the theme to be generated by the practitioner from the practitioner, and the automatic design generating artificial neural network device using a UX-bit which receives the image theme data and the text theme data from the practitioner client and outputs design data corresponding to the image theme data and the text theme data.

Advantageous Effects

As described above, the present disclosure has the following effects.

First, according to one embodiment of the present disclosure, with a new unit called a UX-bit, a plurality of operations to be performed step by step in a development project may be collectively agreed, and results are derived, thereby considerably reducing task resources and time requirements.

Second, according to one embodiment of the present disclosure, in a process of maintaining a project, by using the UX-bit, collective maintenance is performed rather than sequential maintenance, thereby reducing task resources and time requirements.

DESCRIPTION OF DRAWINGS

The following drawings attached to this specification illustrate exemplary embodiments of the present disclosure and function to facilitate further understanding of the technical spirit of the present disclosure along with the detailed description of the invention. Accordingly, the present disclosure should not be construed as being limited to only matters illustrated in the drawings:

FIG. 5 is a diagram illustrating properties and level classification of a UX-bit of a development project collaboration method using a UX-bit according to one embodiment of the present disclosure;

MODES OF THE INVENTION

Figure 1:
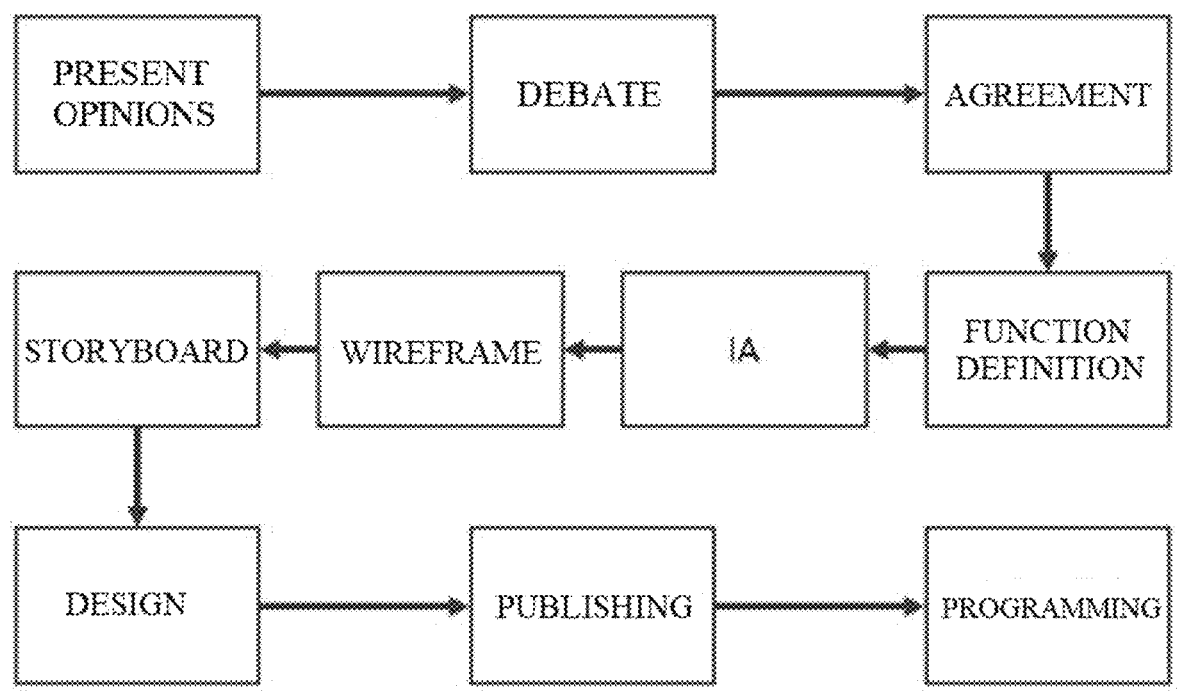
FIG. 1 is a diagram illustrating the performance of an existing project collaboration method.

Hereinafter, embodiments of the present disclosure will be described in detail with reference to the accompanying drawings so that those skilled in the art may easily practice the present disclosure. In describing an operational principle relating to the embodiments of the present disclosure, however, when a detailed description of relevant functions or constructions is deemed to make the subject matter of the present disclosure unnecessarily obscure, the detailed description will be omitted.

Furthermore, the same reference numerals designate elements having similar functions and operations throughout the drawings. Throughout the specification, when it is described that one specific element is connected to the other element, the specific one element may be directly connected to the other element or indirectly connected to the other element through a third element. Furthermore, when it is described that specific element includes another element, it means that the specific element does not exclude another element, but may include other elements, unless otherwise described.

A computing device described in the present specification may include all media in which images are expressed through interaction with a user (only information is not transferred), and examples thereof a digital television (TV), a desktop computer, a mobile phone, a smartphone, a tablet personal computer (PC), a laptop computer, a digital broadcasting terminal, a personal digital assistant (PDA), a portable multimedia player (PMP), a navigation device, a head mounted display (HMD), an augmented reality (AR) card, a head-up display (HUD), and the like.

An operating system (OS) refers to a program that controls hardware and software of a computing device to allow a practitioner to use the computing device. An OS can manage computer resources such as processors, storage devices, and input/output interface devices while serving as an interface between hardware and application programs. For example, types of the OS may include Android, iOS, Windows, Mac, Tizen, Unix, and Linux.

An application program (hereinafter referred to as "program") refers to software developed such that a practitioner can perform a specific task using a device. For example, there may be an e-mail program, a messenger program, a schedule management program, and a document editing program. In addition, the program may include instructions necessary to perform a specific task. Here, the instructions constituting the program may be different from each other according to a type of an OS.

A screen may be defined by an OS. The screen may be a virtual two-dimensional area having coordinates within a preset range. The screen may be displayed by a display device, and a practitioner may visually recognize the screen through the display device. A coordinate range of the screen may be adjusted according to the available resolution of the display device by the OS. A coordinate unit of the screen may correspond to a position of a pixel of the display device.

Some programs may be formed such that an operation form is displayed as an object on a screen. For example, an operation form of some programs may be displayed in the form of an "execution window" as an object on a screen. For example, the execution window may include a document editing window outputted as a document editing program is executed and a web browser window outputted as a web browser application is executed. As another example, the operation form of some programs may be displayed as an object on the screen in the form of a "mouse cursor (a pointer that visually moves along with the movement of a mouse or touchpad and generally has a shape of an arrow)." For example, a mouse cursor and a touch point may be displayed to move within a screen in response to an input means being detected by a practitioner. Some other programs may be formed to operate in the form of a background without being separately displayed on a screen.

When a plurality of objects are displayed on a screen, objects representing operation forms of the programs may be displayed according to a preset level. For example, in an OS, when an area displaying a first object corresponding to a first program overlaps an area displaying a second object corresponding to a second program on a screen, in an overlapping area, the first object may be set to be displayed prior to the second object.

Development Project Collaboration Method Using User Experience (UX)-Bit

A development project collaboration method using a UX-bit according to an embodiment of the present disclosure may be performed by a computing device or by the computing device executing a program.

Hereinafter, embodiments of the present disclosure will be described in detail with reference to the accompanying drawings. In the drawings, the same or similar reference numerals are used to refer to the same or similar elements.

Figure 3:
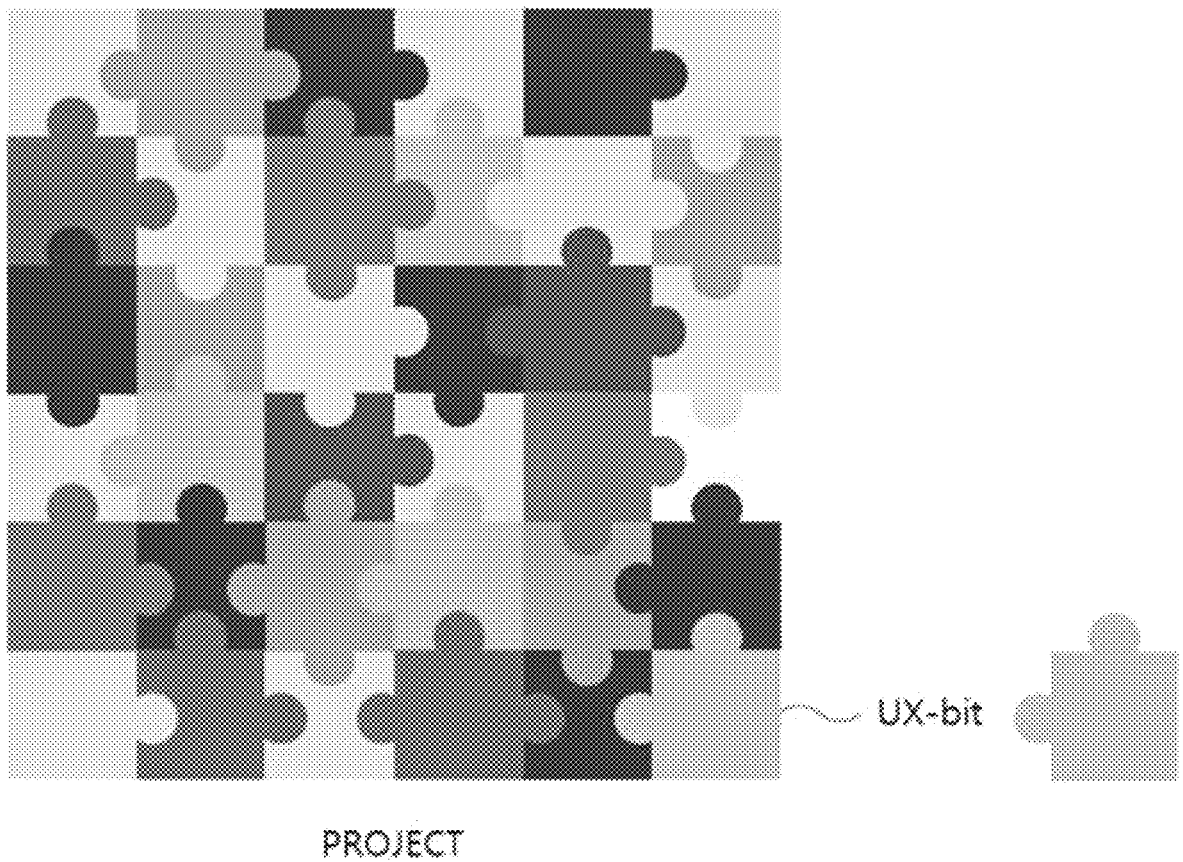
FIGS. 3 and 4 are diagrams for describing a concept of a UX-bit of a development project collaboration method using a UX-bit according to one embodiment of the present disclosure.
Figure 4:
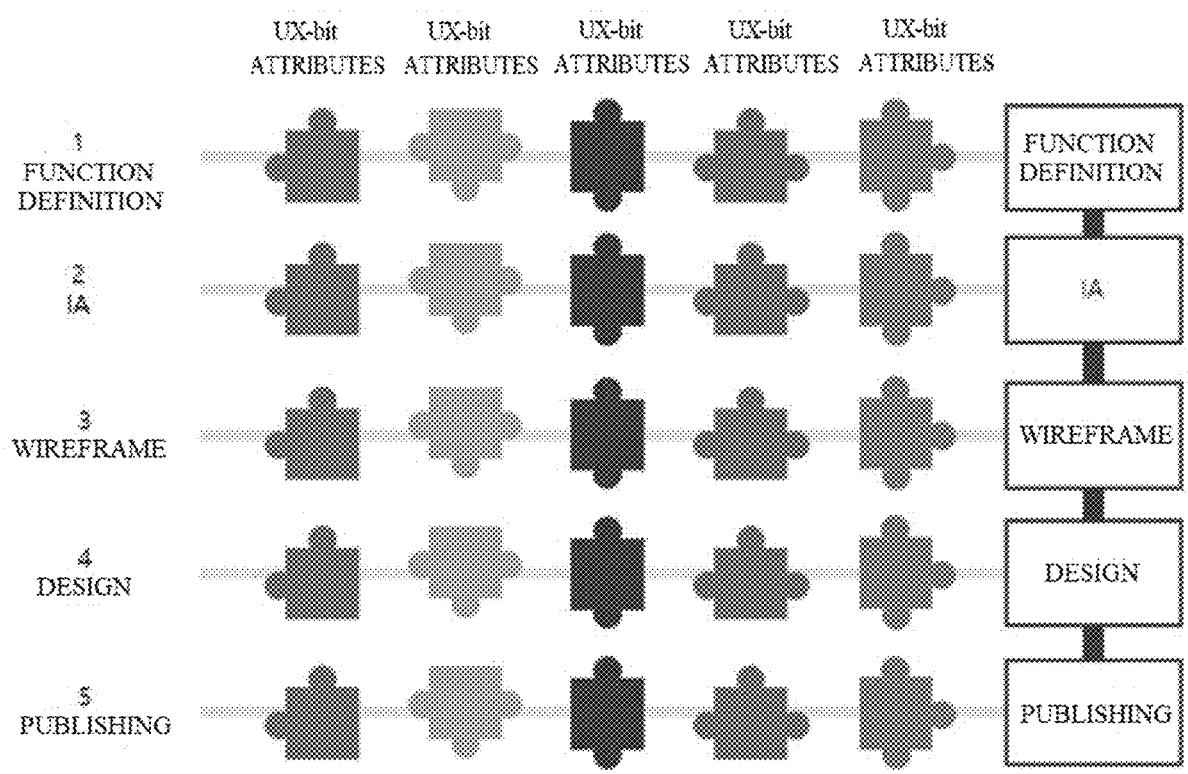
Figure 6:
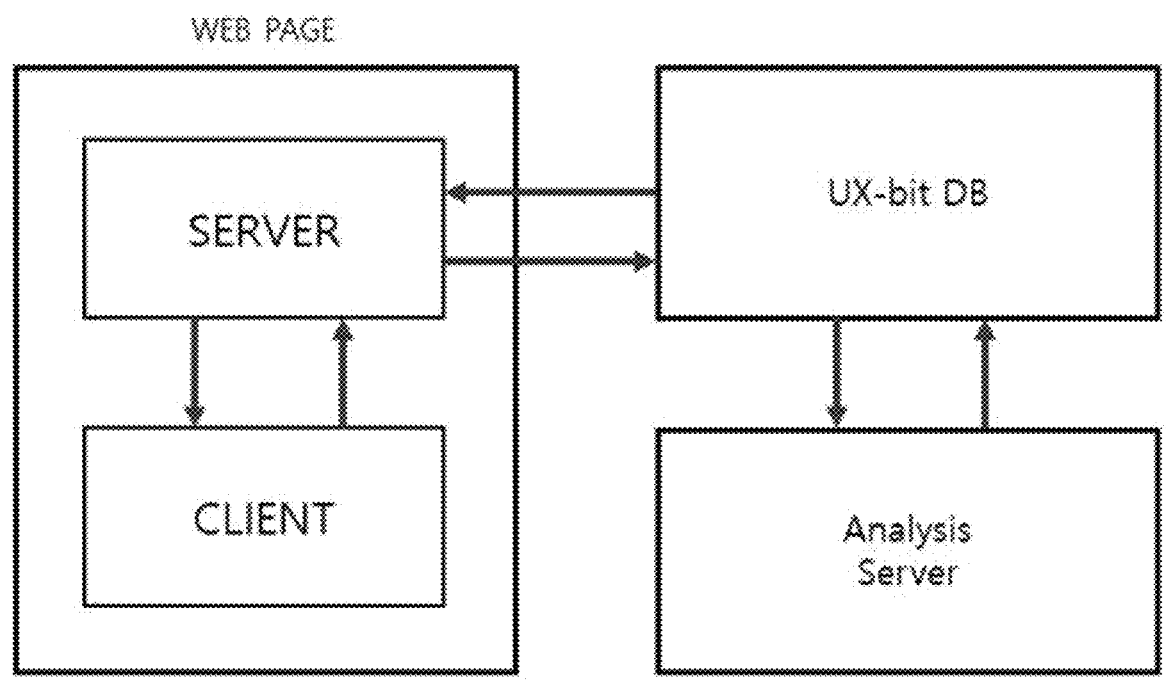
FIGS. 6 to 13 are diagrams for describing a method in which a system of a development project collaboration method using a UX-bit processes data according to one embodiment of the present disclosure.

FIGS. 3 and 4 are diagrams for describing a concept of a UX-bit of a development project collaboration method using a UX-bit according to one embodiment of the present disclosure.

Referring to FIGS. 3 and 4, the UX-bit may be defined as a smallest unit constituting a UX in a process of developing a project.

The UX-bit may be classified and tagged according to a related subject or category. The UX-bit may be classified according to a tagged subject or category and stored in a database. The UX-bit may be combined to other UX-bits to form one output. A computing device may visualize the output to which the UX-bit is coupled and output the visualized output on a screen.

The UX-bit may include information classified according to operations of a function definition, an information architecture (IA), a wireframe, a design, and programming. The UX-bit is the smallest unit of elements constituting the UX and may include a color, a position, a layout, and the like.

In the development project collaboration method using a UX-bit according to one embodiment of the present disclosure, step-by-step operations may be performed in parallel on the UX-bit to check the output at once.

The function definition is information in which, when a service is newly made or renewed, what function is dealt with in a project, what a purpose is, what data is used, and what technical issue is required are listed. The function definition may include information about a function included in the project, a method of implementing the function, and a method of operating the function. The function definition may include a task scenario for each function, an expected function when a service is constructed, requirements, a detailed function, and an application area.

The IA is structural information entirely showing what structure a service has, what function the service has, what role the service plays, and what screen the service is displayed on. The IA may facilitate an interaction between a practitioner and a service to allow the practitioner to easily and quickly find desired information and may include structural information necessary to match an overall image of a service that is thought by a planner, a designer, and a practitioner.

The IA may include depth, labeling, and flow.

The wireframe may approximately summarize and show content, a function, a UI element, and a layout displayed on representative screens before a visual design operation and may refer to a screen blueprint.

The wireframe may include information showing how to convert a functional structure into a function of an interface in order to set a direction of a user interface (UI)/UX design.

The wireframe may include a size and an arrangement of a logo, a menu, an image, text, and a button for each area.

The design may include a format that may be produced as a UX design result such as a photoshop document (PSD), an XD document, a schema, or a zeplin that visually shows a screen to be actually implemented by adding design elements (color, typography, and image) based on the wireframe.

The design may include information capable of supplementing visual problems by confirming a planned service with an actual visual design before development.

The design may include actual screen data for each function including an action.

The programming may include code work information for implementing a visually planned design into an actual service. In the programming, it is possible to implement a planned service and review a technology. The programming may include a service development language and codes implemented with the service development language.

FIG. 5 is a diagram illustrating properties and level classification of a UX-bit of a development project collaboration method using a UX-bit according to one embodiment of the present disclosure.

Referring to FIG. 5, the UX-bit may be classified into a function UX-bit and a design UX-bit according to properties. The UX-bit may be classified into a plurality of levels according to each property.

Levels of the function UX-bit may be classified into level 1 including a word unit, level 2 including a word combination, level 3 including a group of concepts, level 4 including hierarchy information, level 5 including area information, level 6 including screen information, level 7 including a code, and level 8 including a completed service.

The word unit of level 1 of the function UX-bit may include word information about a concept of a function. The word combination of level 2 may include a function represented by a complex concept (compound word: word+word). In level 3, the group of concepts may include information in which concepts are grouped and classified according to a certain criterion. Level 4 may include information about a hierarchy between the concepts or the groups. Level 5 may include area information according to a concept, a group, and a hierarchy. Level 6 may include wireframe information including an area, a target, and a goal which are displayed on a screen. Level 7 may include a code for implementing the function. Level 8 may include a service completed with a combination of implemented functions.

Levels of the design UX-bit may include level 1 including a formative attribute, level 2 including a value of a formative attribute, level 3 including a combination of a formative attribute and a value, level 4 including a group of attribute combinations, level 5 including a design language, level 6 including screen information, and level 7 including publishing information.

The formative attribute of level 1 of the design UX-bit may include text, image, color, shape, and size information. The value of the formative attribute of level 2 may include a text font, a color, a size, and a thickness. The group of the attribute combinations of level 4 may show a visually displayed style. The design language of level 5 may include concept and atmosphere information. The screen information of level 6 may include format that may be produced as a UX design result such as a PSD, an XD document, a schema, or a zeplin. The publishing information of level 7 may include hypertext mark-up language (HTML) and cascading style sheet (CSS) information.

According to one embodiment of the present disclosure, when a search function is generated in the function UX-bit, a UX-bit related to a search may be reviewed at level 1, a UX-bit related to an automatic search may be reviewed at level 2, a range of the search function may be reviewed at level 3, a hierarchy of a search and a result may be determined at level 4, a position of a search and a search result may be determined at level 5, a wireframe of a search and a search result may be determined at level 6, a programming language for a search function may be reviewed at level 7, and a completed search function may be generated at level 8.

According to one embodiment of the present disclosure, when text is input to a title area of a page in the design UX-bit, text content may be reviewed at level 1, a font, a color, a size, and a thickness may be reviewed at level 2, a title may be reviews at level 3, a form may be reviewed at level 4, a detailed design feeling may be reviewed at level 5, a PSD file to which design elements are applied may be reviewed at level 6, and a publishing code for converting a PSD format may be reviewed and may be coupled to a result of level 7 of the function UX-bit to generate a completed search function at level 7.

Figure 2:
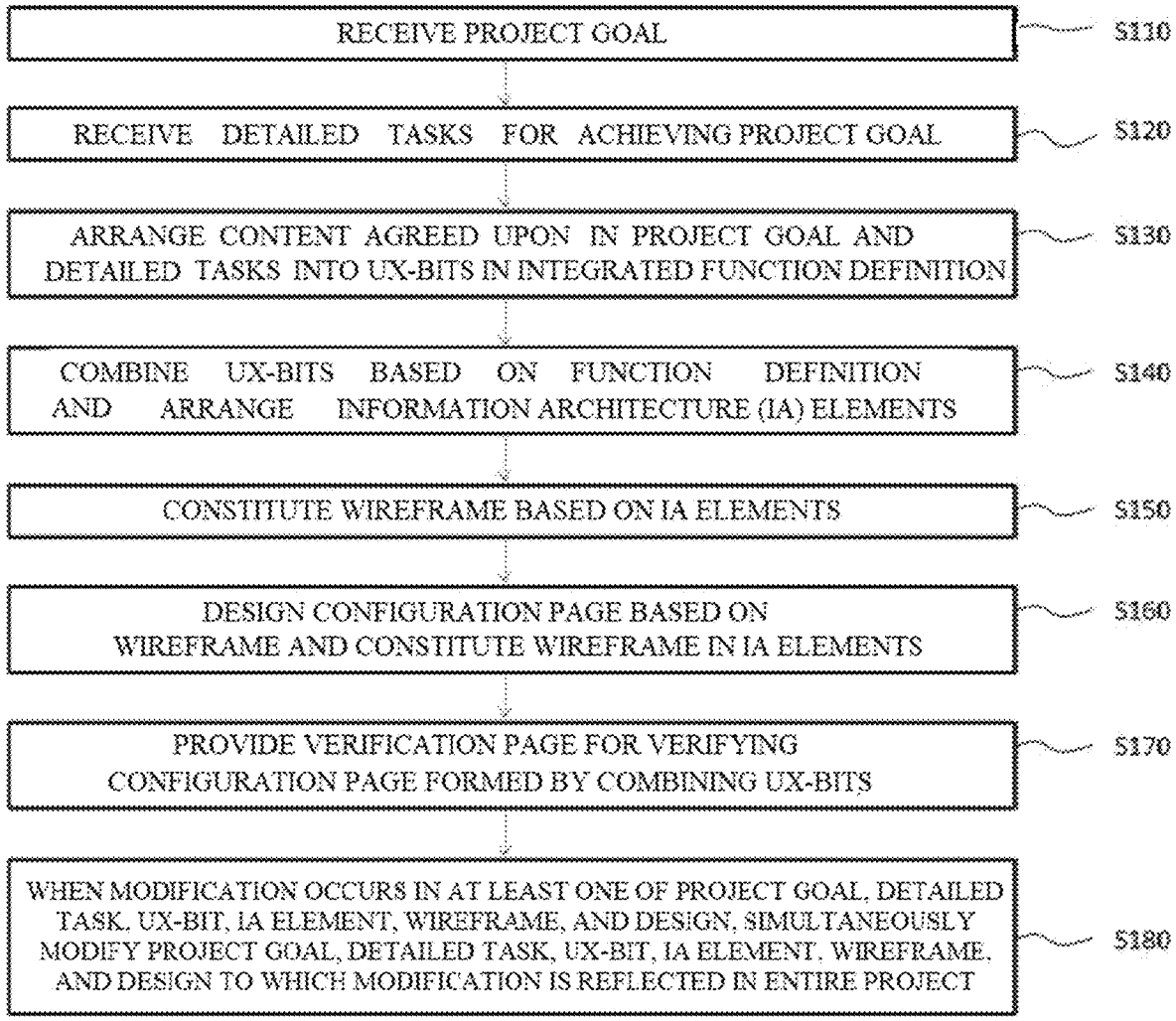
FIG. 2 is a flowchart of a development project collaboration method using a user experience (UX)-bit according to one embodiment of the present disclosure.

FIG. 2 is a flowchart of a development project collaboration method using a UX-bit according to one embodiment of the present disclosure. FIGS. 6 to 13 are diagrams for describing a method in which a system of a development project collaboration method using a UX-bit processes data according to one embodiment of the present disclosure.

Referring to FIGS. 2 to 10, the development project collaboration method using a UX-bit according to the embodiment of the present disclosure may include operation S110 of receiving a project goal, operation S120 of receiving detailed tasks for achieving the project goal, and operation S130 of arranging content agreed upon in the project goal and the detailed tasks into UX-bits in an integrated function definition.

In operation S110, a computing device may receive the project goal from a practitioner.

In operation S110, the project goal may include resources such as a project target value, a project period, input manpower, and input infrastructure equipment.

In operation S120, the computing device may receive the detailed tasks for achieving the project goal from the practitioner. When there are a plurality of project goals, the computing device may receive detailed tasks for each goal.

In operation 120, an execution plan UX-bit database (DB) may receive the detailed tasks for achieving the project goal input by the practitioner.

In operation S130, the computing device may arrange the content agreed upon in the project goal and the detailed tasks into the UX-bits in the integrated function definition.

In operation S130, by using data stored in at least one of the execution plan UX-bit DB and a function definition UX-bit DB, the computing device may arrange the content agreed upon in the project goal and the detailed tasks into the UX-bits.

Figure 14:
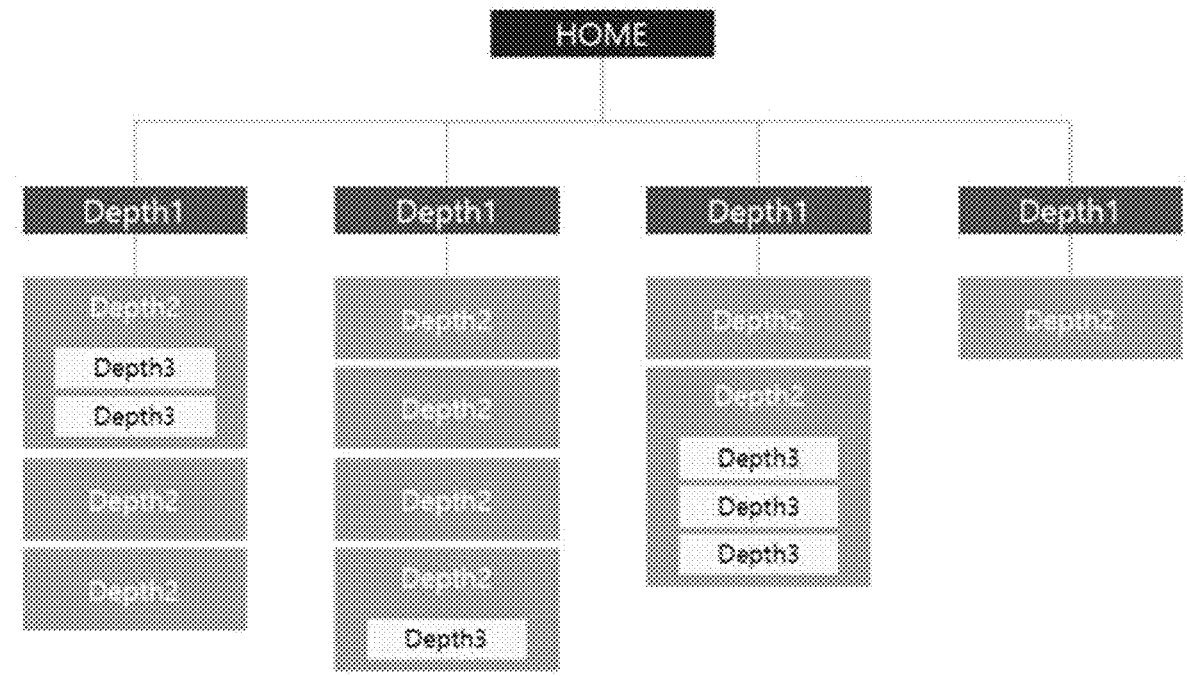
FIG. 14 is a diagram for describing a concept of an information architecture (IA)

FIG. 14 is a diagram for describing a concept of an IA.

Referring to FIG. 14, depths of an IA structure may be visually distinguished, a position at which any information is positioned by being labeled in the structure may be identified, and the IA may be identified by indicating a flow of each information with an arrow.

The development project collaboration method using a UX-bit according to the embodiment of the present disclosure may include operation S140 of combining the UX-bits based on the function definition and arranging IA elements.

In operation S140, the computing device may extract information a function of a program to be developed, and IA, wireframe, design, and programming information from the function definition determined by the practitioners. The computing device may arrange the IA elements based on content defined in the function definition.

In operation S140, by using data stored in at least one of the function definition UX-bit DB and an IA UX-bit DB, the computing device may arrange the IA element at a position determined in the function definition.

The computing device may arrange the IA elements by searching for the UX-bit using a word extracted from the function definition as a keyword.

The computing device may modify the arrangement of the IA elements by reflecting results input by the practitioner through drag and drop.

In the development project collaboration method using a UX-bit according to one embodiment of the present disclosure, the computing device may receive a word from the practitioner or from the function definition. The computing device may find a keyword related to the word input by the practitioner or extracted from the function definition. The computing device may search for and provide a keyword similar to or related to the word. The computing device may label and store the keyword. The keyword may be labeled with a similar or related word. When a labeled word is input as a search word, the keyword may be exposed as a keyword that may be selected by the practitioner. The keyword may include relevance as probability information according to a ratio in which the labeled word is input as the search word, exposed, and selected. The practitioner may select a keyword displayed on a screen of the computing device.

Operation S140 may include an operation of presenting at least one IA option based on the function definition and an operation of providing an edit page for editing a position and a connection relationship of the IA elements.

The operation of providing the edit page may include an operation of arranging the dragged and dropped IA elements, an operation of connecting the arranged IA elements with lines according to levels or hierarchies, an operation of modifying the arranged and connected IA elements according to a practitioner's choice, and an operation of reflecting a change in arrangement of the IA elements, which is caused by selecting and customizing a wireframe layout, on the arranged and connected IA elements.

Figure 15:
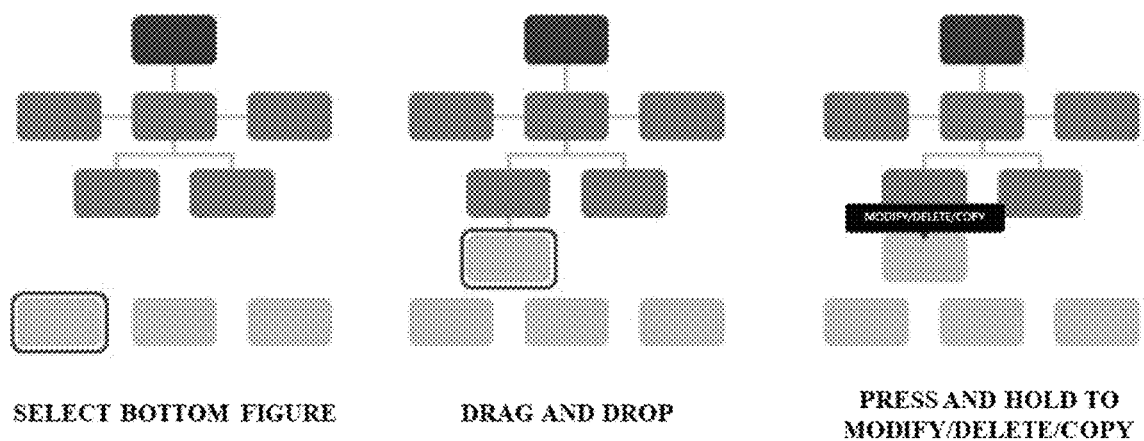
FIG. 15 shows diagrams for describing an IA arrangement and connection page of a development project collaboration method using a UX-bit according to one embodiment of the present disclosure.

FIG. 15 shows diagrams for describing an IA arrangement and connection page of the development project collaboration method using a UX-bit according to one embodiment of the present disclosure.

Referring to FIG. 15, the practitioner may generate an IA by dragging and dropping the UX-bits on the IA arrangement and connection page. When the practitioner moves the IA elements through drag and drop to generate the IA, according to information such as a hierarchy of the IA elements, the IA elements may be connected to form a flow and complete the IA. When pressing and holds the IA element in the completed IA, the practitioner may modify, delete, and copy the IA element.

The development project collaboration method using a UX-bit according to the embodiment of the present disclosure may include operation S150 of constituting a wireframe based on the determined IA elements.

In operation S150, the computing device may constitute the wireframe based on the IA elements arranged in operation S140.

Operation S150 of constituting the wireframe may include an operation of presenting a plurality of wireframe layouts based on the arranged and connected IA elements and an operation of selecting and customizing the wireframe layouts by reflecting a practitioner's choice.

In operation S150, by using data stored in at least one of the function definition UX-bit DB, the IA UX-bit DB, and a wireframe UX-bit DB, the computing device may constitute the wireframe according to the arrangement of the IA elements.

Figure 16:
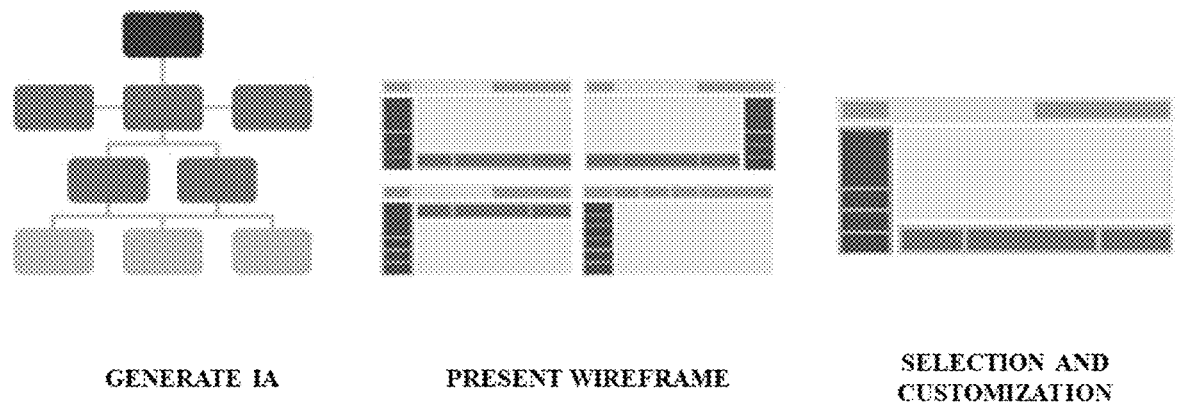
FIG. 16 shows diagrams for describing a wireframe configuration page of a development project collaboration method using a UX-bit according to one embodiment of the present disclosure.

FIG. 16 shows diagrams for describing a wireframe configuration page of the development project collaboration method using a UX-bit according to one embodiment of the present disclosure.

Referring to FIG. 16, in the development project collaboration method using a UX-bit according to one embodiment of the present disclosure, a wireframe layout may be presented based on an IA determined in a previous operation.

In the presented wireframe layout, the wireframe layout may be changed by reflecting a practitioner's choice and custom content. The practitioner may change the wireframe layout through a simple operation of dragging or clicking the layout. In the operation of selecting and customizing the wireframe layout by reflecting the practitioner's choice, wireframe layouts of a plurality of screens (units) may be changed. According to one embodiment of the present disclosure, when the wireframe layout is modified and changed for each screen (unit) and one screen (unit) is modified and changed, it is possible to move to a page for modifying and changing a next screen (unit) connected to the IA.

In the development project collaboration method using a UX-bit according to one embodiment of the present disclosure, the computing device may detect a keyword related to a project. The computing device may search for and present U-bits based on the extracted keyword. UX-bits selected from among the found UX-bits by the practitioner may be transferred to the IA arrangement and connection page.

The development project collaboration method using a UX-bit according to the embodiment of the present disclosure may include operation S160 of designing a configuration page based on the determined wireframe.

In operation S160, the design UX-bits selected by the practitioner may be combined based on the IA arrangement and connection page to design the configuration page.

Operation S160 of designing the configuration page may include an operation of presenting a design option in order of design UX-bit levels, an operation of modifying the design option by reflecting a practitioner's choice, and an operation of storing and managing the option of the design UX-bits generated as publishing UX-bits.

Operation S160 may further include an operation of reviewing connectivity between the stored publishing UX-bit and a development language.

In operation S160, the computing device may constitute a design of the constituted wireframe using data stored in at least one of the function definition UX-bit DB, the UX-bit IA DB, the wireframe UX-bit DB, and a design UX-bit DB.

Operation S160 may include the operation of presenting the design option in order of the design UX-bit levels, then operation of modifying the design option by reflecting the practitioner's choice, and the operation of storing and managing the option of the design UX-bits generated as the publishing UX-bits.

Figure 8:
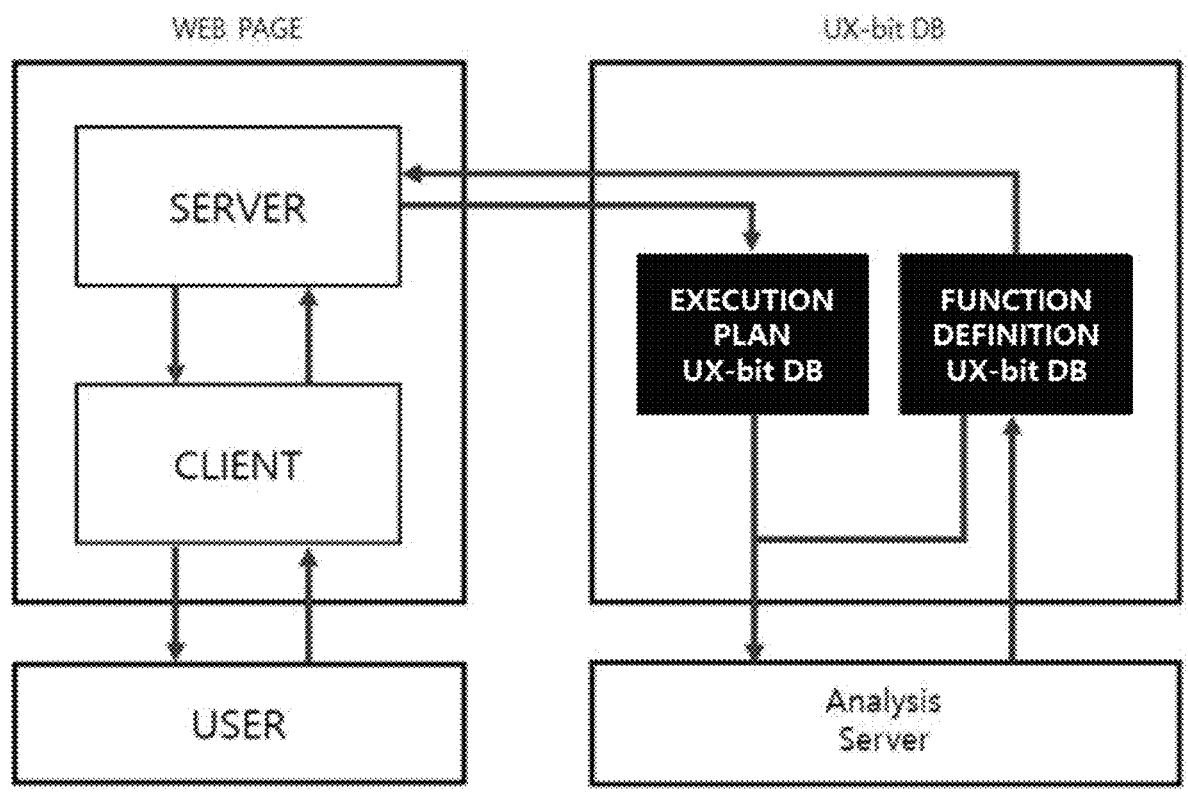
Figure 9:
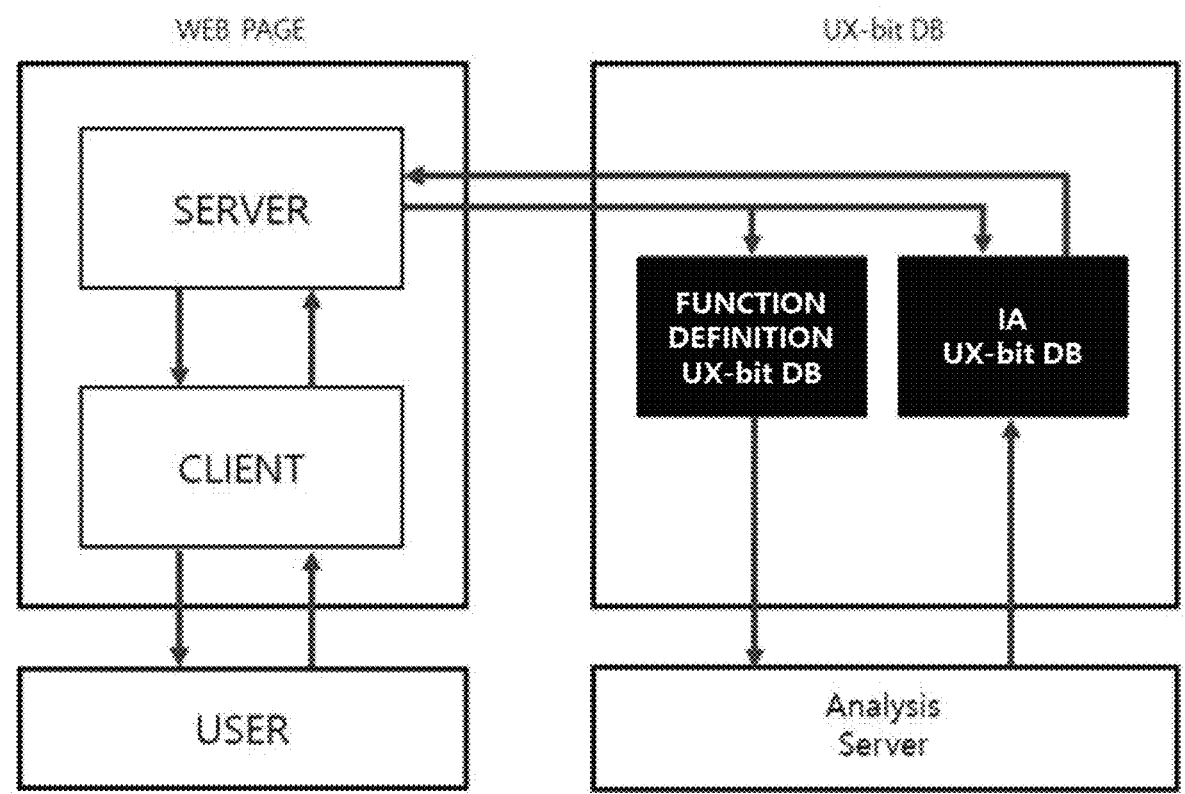
Figure 10:
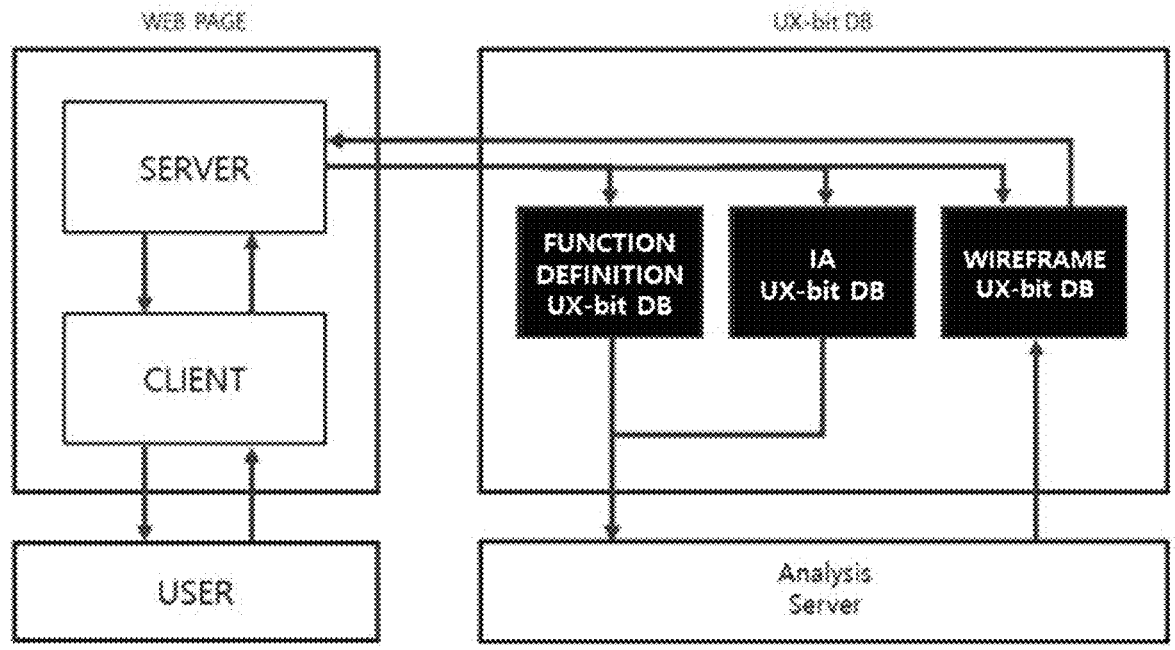
Figure 11:
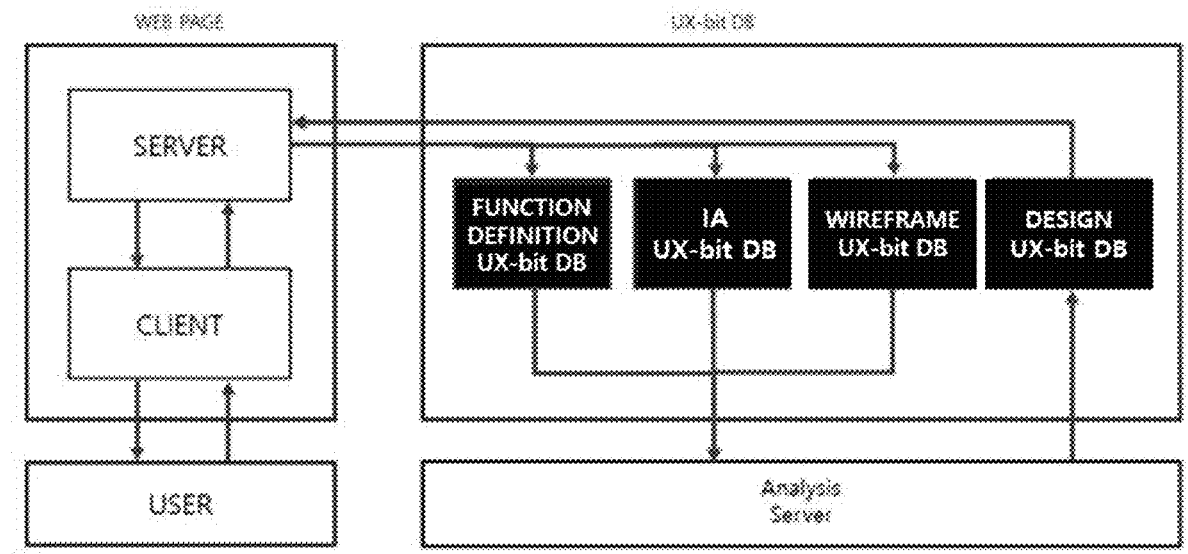
Figure 12:
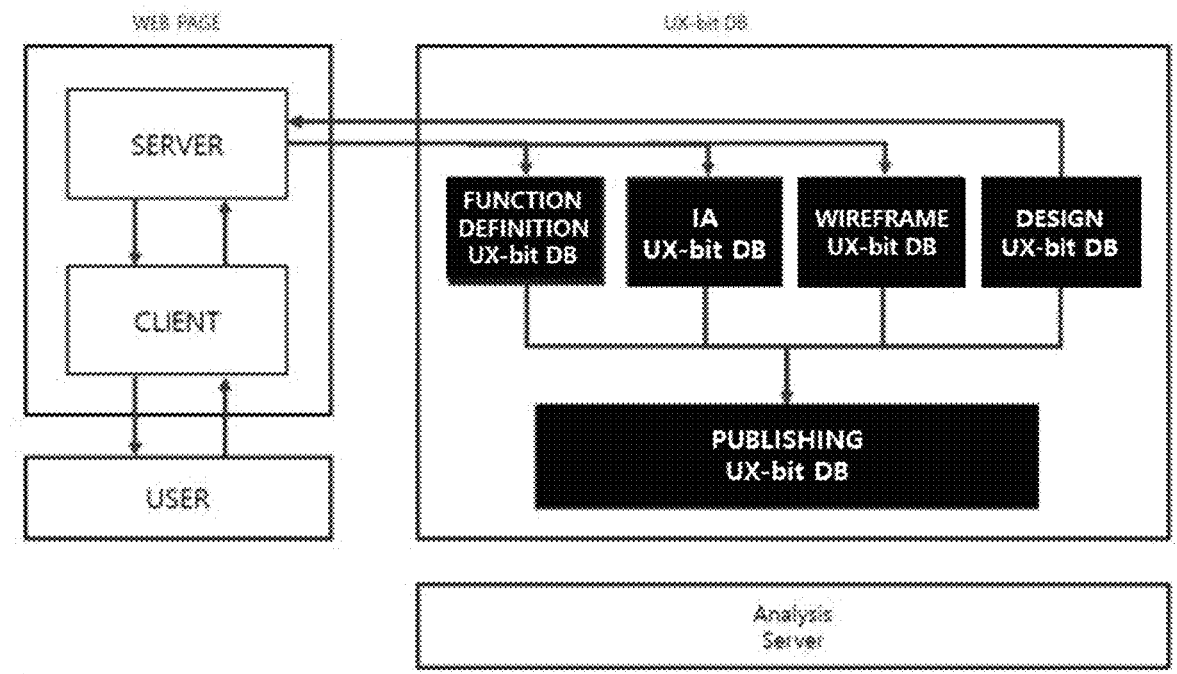
Figure 13:
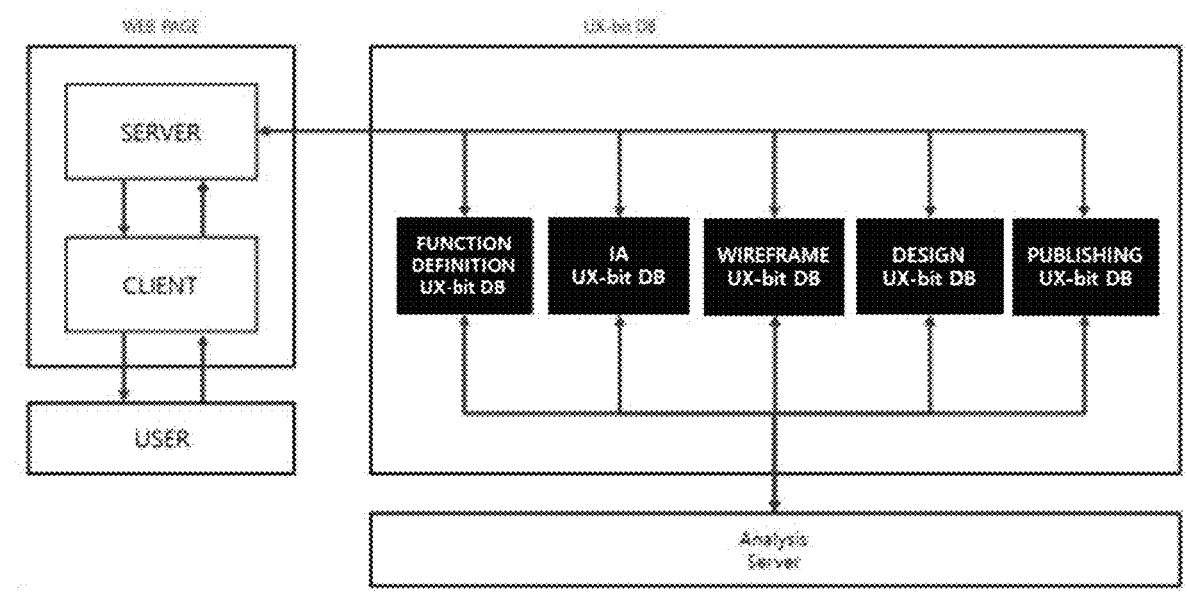

Referring to FIGS. 8 and 9, in the operation of storing and managing the option of the design UX-bits generated as the publishing UX-bits, the design of the wireframe constituted using data stored in at least one of the function definition UX-bit DB, the IA UX-bit DB, the wireframe UX-bit DB, and the design UX-bit DB may be constituted and stored in the publishing UX-bit DB.

The development project collaboration method using a UX-bit according to the embodiment of the present disclosure may include operation S170 of providing a verification page for verifying the configuration page formed by combining the UX-bits.

In operation S170, the computing device may provide a page for verifying a screen formed by combining the UX-bits combined on the configuration page.

Operation S170 may include an operation of applying and outputting a design to the selected and customized wireframe layout on the screen and an operation of performing a simulation in the same environment as an actual user environment.

The operation of performing the simulation in the same environment as the actual user environment may include an operation of outputting a controller on at least a portion of the screen and an operation of implementing driving of the project according to an input of the practitioner input to the controller.

When the practitioner touches the screen, the controller may be output on at least a portion of the screen.

The display of the controller is merely an example of the case of T-commerce, and depending on the situation, a mouse cursor, a mobile screen configuration, or the like may be output to perform the simulation in the same environment as the actual user environment.

Figure 17:
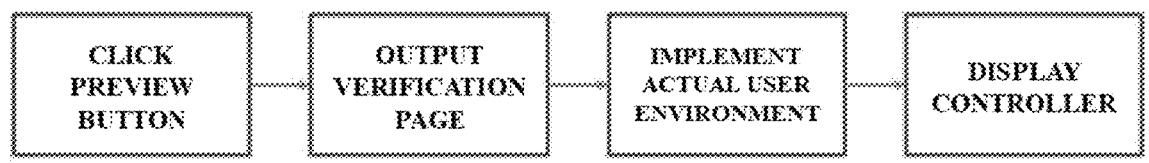
FIGS. 17 and 18 are diagrams for describing a verification page of a development project collaboration method using a UX-bit according to one embodiment of the present disclosure.
Figure 18:
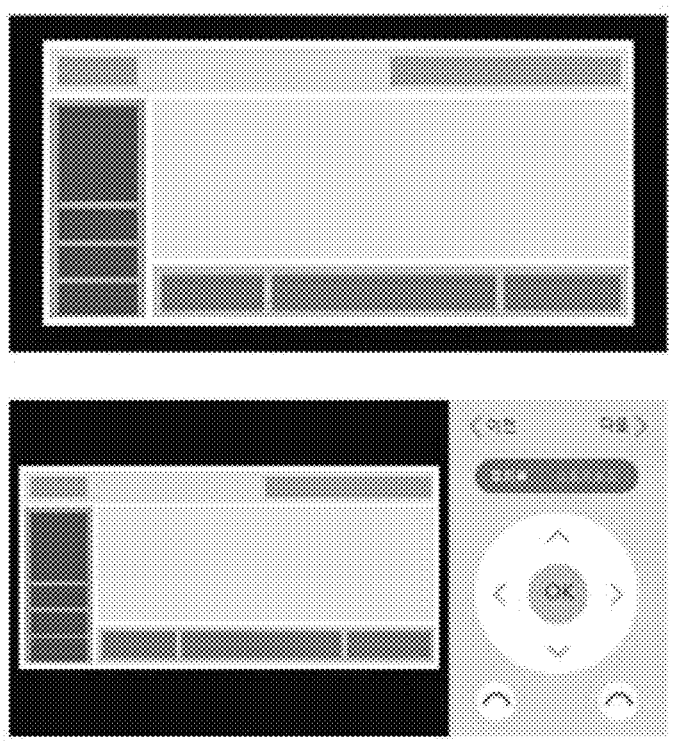

FIGS. 17 and 18 are diagrams for describing a verification page of the development project collaboration method using a UX-bit according to one embodiment of the present disclosure.

Referring to FIGS. 17 and 18, a service page to which a design is applied based on the wireframe determined in a previous operation for the practitioner may be displayed on a screen. The practitioner may manipulate the controller on the service page to check whether an actual program operates normally.

The development project collaboration method using a UX-bit according to the embodiment of the present disclosure may include operation S180 of, when a modification occurs in at least one of the project goal, the detailed task, the UX-bit, the IA element, the wireframe, and the design, simultaneously modifying the project goal, the detailed task, the UX-bit, the IA element, the wireframe, and the design to which the modification is reflected in the entire project.

In operation S180, when, through an input of the practitioner, the modification occurs in at least one of the project goal, the detailed task, the UX-bit, the IA element, the wireframe, and the design, the computing device may simultaneously modify the project goal, the detailed task, the UX-bit, the IA element, the wireframe, and the design to which the modification is reflected in the entire project.

In operation S180, when a modification occurs in the project using data stored in at least one of the function definition UX-bit DB, the IA UX-bit DB, the wireframe UX-bit DB, the design UX-bit DB, and the publishing UX-bit DB, the computing device may collectively modify the function definition, the IA, the wireframe, the design and a publishing part.

A development project collaboration program using a UX-bit according to one embodiment of the present disclosure includes commands that perform a development project collaboration method using a UX-bit which controls a screen defined by an OS at predetermined intervals. The development project collaboration method using a UX-bit may include receiving a project goal, receiving detailed tasks for achieving the project goal, arranging content agreed upon in the project goal and the detailed tasks into UX-bits in an integrated function definition, combining the UX-bits based on the function definition and arranging IA elements, constituting a wireframe based on the IA elements, designing a configuration page based on the wireframe, providing a verification page for verifying the configuration page formed by combining the UX-bits, and when a modification occurs in at least one of the project goal, the detailed task, the UX-bit, the IA element, the wireframe, and the design, simultaneously modifying the project goal, the detailed task, the UX-bit, the IA element, the wireframe, and the design to which the modification is reflected in the entire project.

Figure 19:
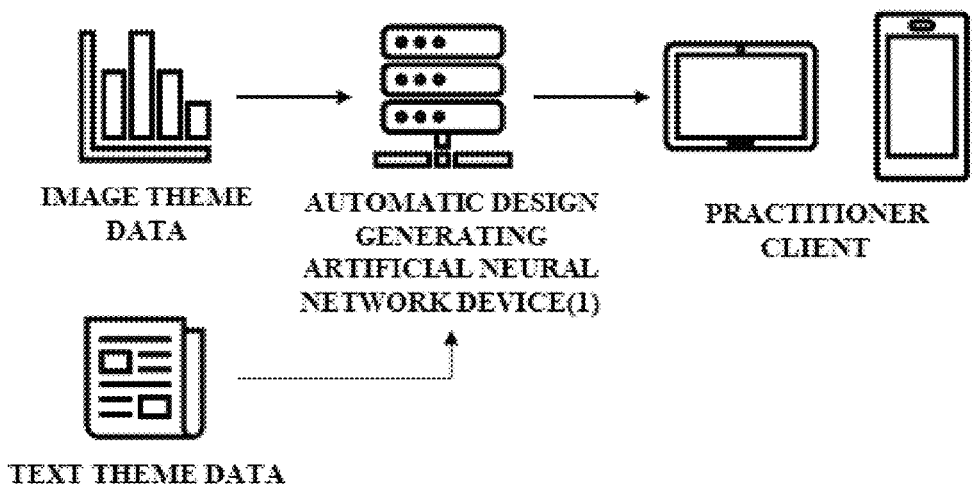
FIG. 19 is a schematic diagram illustrating an operational relationship of an automatic design generating artificial neural network device according to one embodiment of the present disclosure.
Figure 20:
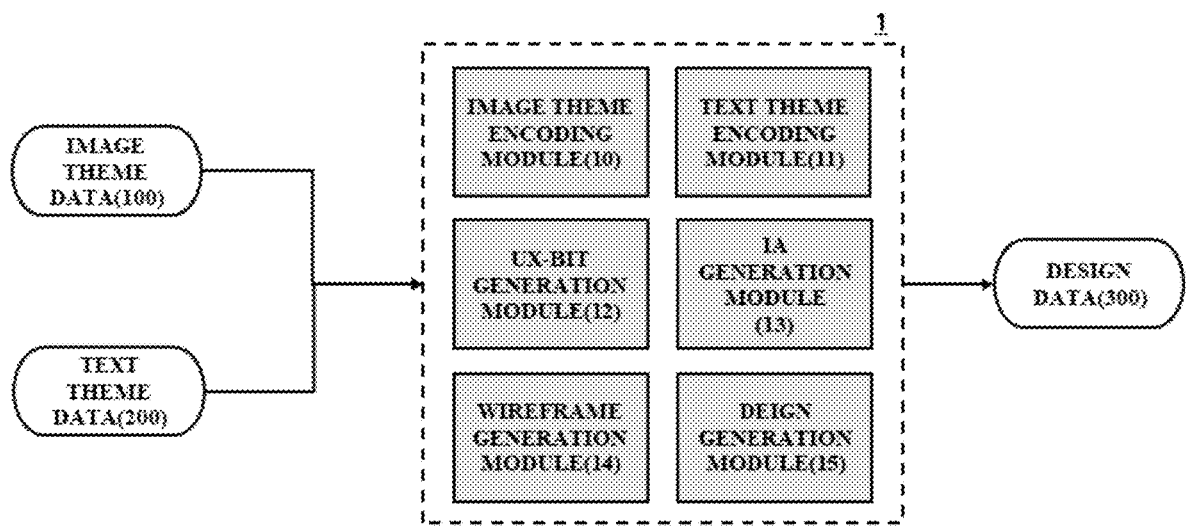
FIG. 20 is a schematic diagram illustrating a specific configuration of the automatic design generating artificial neural network device according to one embodiment of the present disclosure.

Automatic Design Generating Artificial Neural Network Device and Method Using UX-Bit FIG. 19 is a schematic diagram illustrating an operational relationship of an automatic design generating artificial neural network device according to one embodiment of the present disclosure. FIG. 20 is a schematic diagram illustrating a specific configuration of the automatic design generating artificial neural network device according to one embodiment of the present disclosure. As shown in FIGS. 19 and 20, the automatic design generating artificial neural network device 1 according to one embodiment of the present disclosure is configured to receive image theme data 100 and text theme data 200 as input data and output design data 300 as output data to a practitioner client.

The image theme data 100 may be an image representing a theme of a web/app graphic design to be generated by a practitioner through the automatic design generating artificial neural network device 1 and may be input to the automatic design generating artificial neural network device 1 from the practitioner client by a practitioner's choice.

The text theme data 200 may be text representing the theme of the web/app graphic design to be generated by the practitioner through the automatic design generating artificial neural network device 1 and may be input to the automatic design generating artificial neural network device 1 from the practitioner client by an input of the practitioner.

The design data 300 refers to a web/app graphic design for a specific page generated by the automatic design generating artificial neural network device 1.

An image theme encoding module 10 is an encoding module which receives the image theme data 100 as input data and outputs an image theme encoding vector as output data. The image theme encoding module 10 according to one embodiment of the present disclosure may include a ConvNet (convolutional neural network (CNN) encoder).

A text theme encoding module 11 is an encoding module which receives the text theme data 200 as input data and outputs a text theme encoding vector as output data. For example, the text theme encoding module 11 according to one embodiment of the present disclosure may segment the text theme data 200 in units of a phoneme and uses the text theme data 200 as input data and may refer to an encoding module composed of an artificial neural network having a structure of single layer convolution with ReLU-max pooling with stride 5=segment embeddings-four layer highway network-single layer bidirectional GRU.

Figure 21:
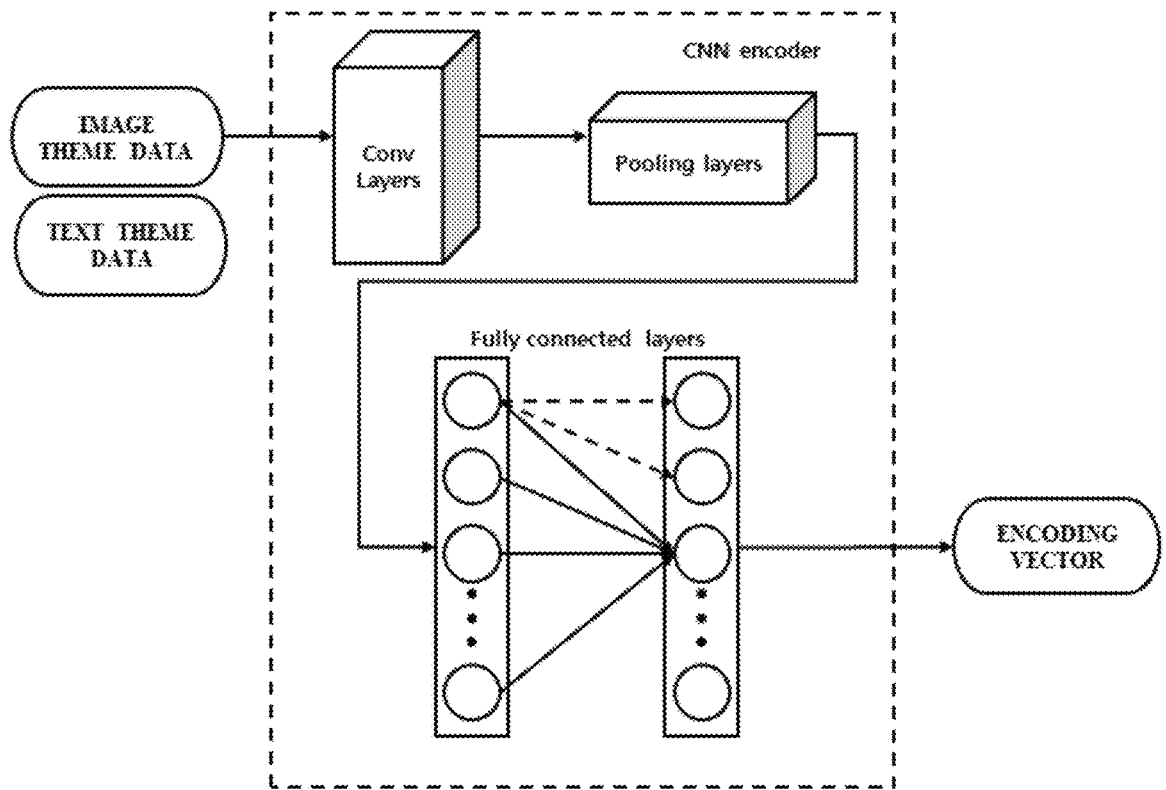
FIGS. 21 and 22 are exemplary diagrams of a ConvNet (convolutional neural network (CNN) encoder) included in an image theme encoding module (10) and a text theme encoding module (11) according to one embodiment of the present disclosure.
Figure 22:
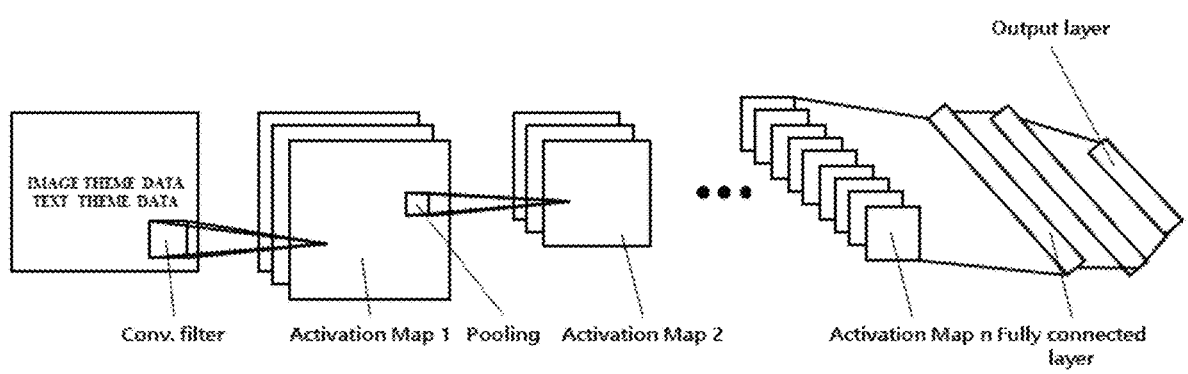

FIGS. 21 and 22 are exemplary diagrams of a ConvNet (CNN encoder) included in the image theme encoding module 10 and the text theme encoding module 11 according to one embodiment of the present disclosure. As shown in FIGS. 21 and 22, as an example, a simple ConvNet may be constructed as [INPUT-CONV-RELU-POOL-FC]. In the case of an input vector, when an input matrix INPUT has a width of 32, a length of 32, and a red-green-blue (RGB) channel, an input size may be [32×32×3]. A CONV layer (Cony. Filter) is connected to a partial area of the input matrix and calculates the dot product of the connected area and a weight thereof. A result volume has a size of [32×32×12]. A RELU layer is an activation function such as a max (0,x) applied to each element. The RELU layer does not change the size of [32×32×12] of the volume. As a result, the RELU layer generates activation map 1. A pooling (POOL) layer performs downsampling on a "horizontal/vertical" dimension and outputs a reduced volume (activation map 2) such as [16×16×12]. The fully connected (FC) layer calculates class scores and outputs a pressure distribution vector volume having a size of [1×1×n] (output layer). The FC layer is connected to all elements of a previous volume.

As described above, the ConvNet included in the image theme encoding module 10 and the text theme encoding module 11 transforms an original matrix composed of pixel values into class scores for distribution through each layer. Some layers have parameters, but some layers do not have parameters. In particular, the CONV/FC layers are activation functions that include not only input volumes but also weights and biases. On the other hand, the RELU/POOL layers are fixed functions. Parameters of the CONV/FC layers are learned through a gradient descent such that a class score for each matrix is equal to a label of a corresponding matrix.

The parameters of the CONV layer of the ConvNet included in the image theme encoding module 10 and the text theme encoding module 11 are composed of a series of trainable filters. Each filter is small in a horizontal/vertical dimension but encompasses an entire depth in a depth dimension. During a forward pass, each filter is slid along a horizontal/vertical dimension of an input volume (exactly, is convolved) to generate a two-dimensional activation map. When a filter is slid over an input, a dot product is performed between the filter and the input volume. Through such a process, the ConvNet learns a filter that activates for a specific pattern at a specific position in input data. Such activation maps are stacked in a depth dimension to become an output volume. Therefore, each element of the output volume handles only a small area of the input, and neurons in the same activation map share the same parameters because the same filter is applied.

Examples of network structures usable for the ConvNet included in the image theme encoding module 10 and the text theme encoding module 11 are as follows.

LeNet. The first successful ConvNet applications have been created by Yann LeCun in the 1990s. Among the first successful ConvNet applications, a LeNet architecture for reading zip codes or numbers is the most famous.

AlexNet. An AlexNet created by Alex Krizhevsky, Ilya Sutskever, and Geoff Hinton makes a ConvNet famous in the field of computer vision. The AlexNet participated in the ImageNet ILSVRC challenge 2012 and won first place by a large margin over second place (top 5: error rate of 16% and second place: error rate of 26%). An architecture thereof is basically similar to that of the LeNet but is deeper and larger.

Also, in the past, unlike the POOL layer being stacked immediately after one CONV layer, a plurality of CONV layers were stacked.

ZF Net. The winner of the ILSVRC 2013 were created by Matthew Zeiler and Rob Fergus. The winner is called a ZFNet after the authors. The ZFNet was created by modifying hyperparameters such as resizing a middle CONV layer in the AlexNet.

GoogLeNet. The winners of ILSVRC 2014 are Szegedy et al. A GoogLeNet was created by Google. The biggest contribution of such a model is to propose an Inception module which considerably reduces the number of parameters (4 M as compared with 60 M for the AlexNet). In addition, instead of FC layers, average pooling is used at the end of a ConvNet to reduce a lot of parameters that are not very important.

VGGNet. A network that won second place in the ILSVRC 2014 was a model called a VGGNet created by Karen Simonyan and Andrew Zisserman. The biggest contribution of the model is to show that a depth of a network is a very important factor for good performance. Among a plurality of models proposed by Karen Simonyan and Andrew Zisserman, the best model includes 16 CONV/FC layers, and all convolutions are 3×3, and all pooling is only 2×2. Although the VGGNet had slightly lower matrix classification performance than the GoogLeNet, it was later found that the VGGNetto had better performance on several transfer learning tasks. Thus, recently, the VGGNet has been used for extracting matrix features. The VGGNet has disadvantages in that a lot of memory (140M) is used, and a large amount of computation is required.

ResNet. A Residual Network created by Kaiming He et al. won the ILSVRC 2015. The Residual Network is characterized by using a unique structure called a skip connection and using a lot of batch normalization. Such an architecture does not use an FC layer in a last layer.

In particular, the image theme encoding module 10 may include an artificial neural network having the following structure.

[55×55×96] CONV1: 96@ 11×11, stride=4, parameter=0
[27×27×96] MAX POOL1: 3×3, stride=2
[27×27×256] CONV2: 256@ 5×5, stride=1, parameter=2
[13×13×256] MAX POOL2: 3×3, stride=2
[13×13×384] CONV3: 384@ 3×3, stride=1, parameter=1
[13×13×384] CONV4: 384@ 3×3, stride=1, parameter=1
[13×13×256] CONV5: 256@ 3×3, stride=1, parameter=1
[6×6×256] MAX POOL3: 3×3, stride=2
FC6: 4096 neurons
FC7: 4096 neurons In the example above, CONV refers to a convolution layer, MAX POOL refers to a pooling layer, and FC refers to a fully connected layer.

Figure 23:
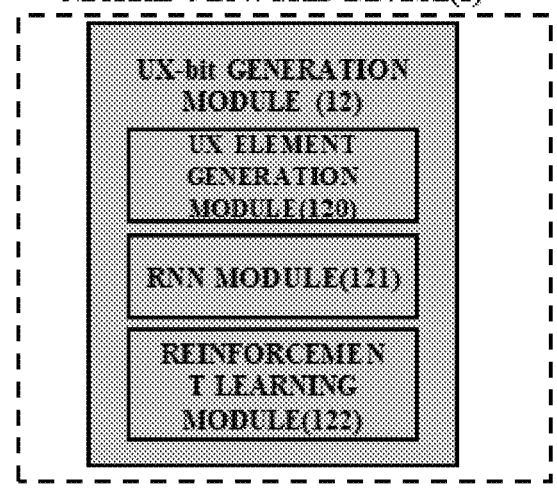
FIG. 23 is a schematic diagram illustrating a specific configuration of a UX-bit generation module (12) according to one embodiment of the present disclosure.

A UX-bit generation module 12 is a module which receives an image theme encoding vector and a text theme encoding vector as input data and outputs UX-bit function attributes and UX-bit design attributes of UX-bits for a design, which is to be generated in the automatic design generating artificial neural network device 1, as output data. FIG. 23 is a schematic diagram illustrating a specific configuration of the UX-bit generation module 12 according to one embodiment of the present disclosure. As shown in FIG. 23, the UX-bit generation module 12 may include a UX element generation module 120, a recurrent neural network (RNN) module 121, and a reinforcement learning module 122.

Figure 24:
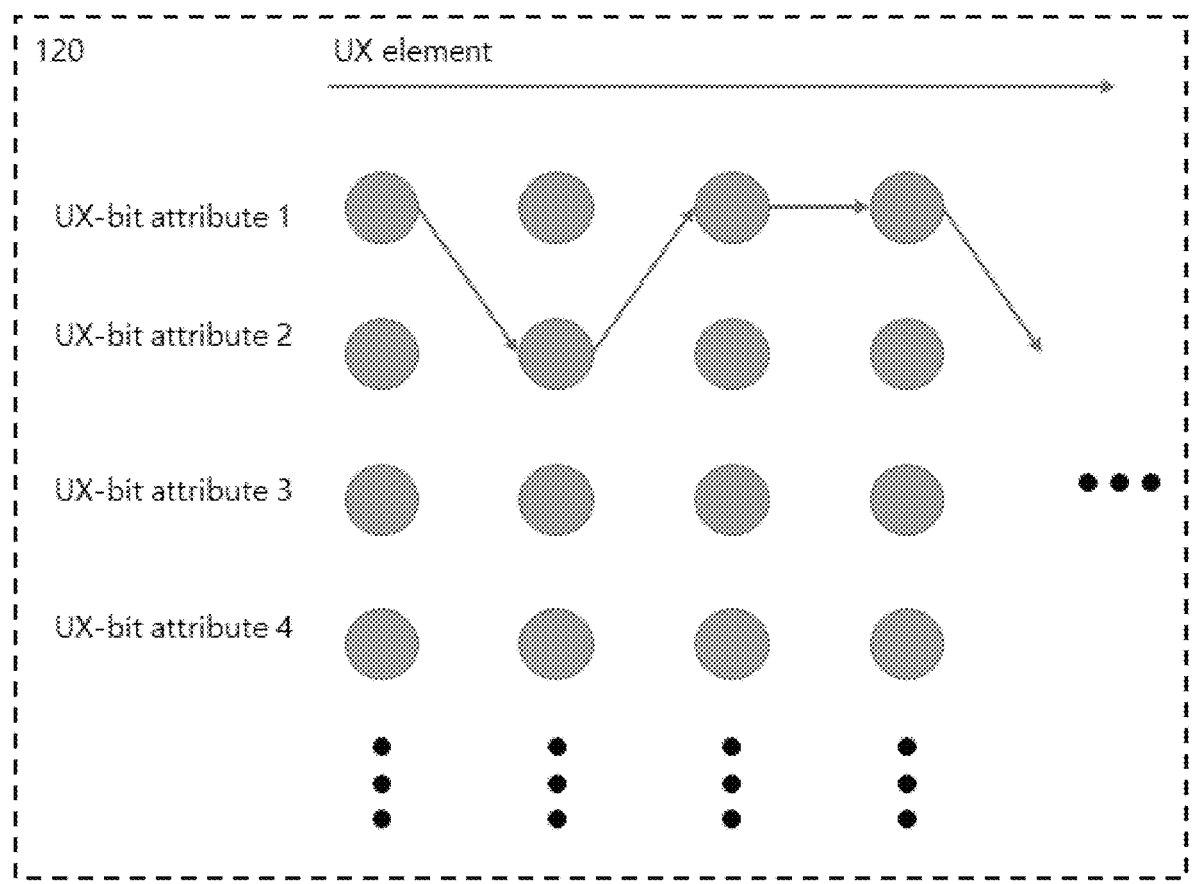
FIG. 24 is a schematic diagram illustrating a UX-bit element generation module (120) according to one embodiment of the present disclosure.

The UX element generation module 120 is a module which generates a plurality of UX elements to match the UX-bit function attribute and the UX-bit design attribute with a specific UX element. More specifically, the UX element generation module 120 is a module which generates the plurality of UX elements to match a combination of the UX-bit function attributes (hereinafter referred as UX-bit function attributes) and a combination of the UX-bit design attributes (hereinafter referred as UX-bit design attributes) with the specific UX element. FIG. 24 is a schematic diagram illustrating the UX-bit generation module 120 according to one embodiment of the present disclosure. As shown in FIG. 24, the UX element generation module 120 may be configured to generate a plurality of UX elements to match UX-bit function attributes/UX-bit design attributes with a specific UX element and may be configured to continuously generate new UX elements in which at least one UX-bit attribute is selected from a plurality of UX-bit attributes by the RNN module 121 to match the specific UX element.

The RNN module 121 may be an artificial neural network module including a plurality of RNN blocks which match a combination of UX-bit function attributes and a combination of UX-bit design attributes (hereinafter referred to as UX-bit design attributes) with a pre-generated UX element, wherein the plurality of RNN blocks include a first RNN cell and a second RNN cell. An image theme encoding vector and a text theme encoding vector may be received as initial input data, the first RNN cell may receive the initial input data or output data of a previous cell and RNN hidden layer information and may output UX-bit function attributes (a specific combination of the UX-bit function attributes) of an $n^{th}$ UX element, and the second RNN cell may be configured to receive the UX-bit function attributes and the RNN hidden layer information, which are output data of the previous cell, and output UX-bit design attributes (a specific combination of the UX-bit design attributes) with respect to the UX-bit function attributes of the $n^{th}$ UX element output from the first RNN cell.

Figure 7:
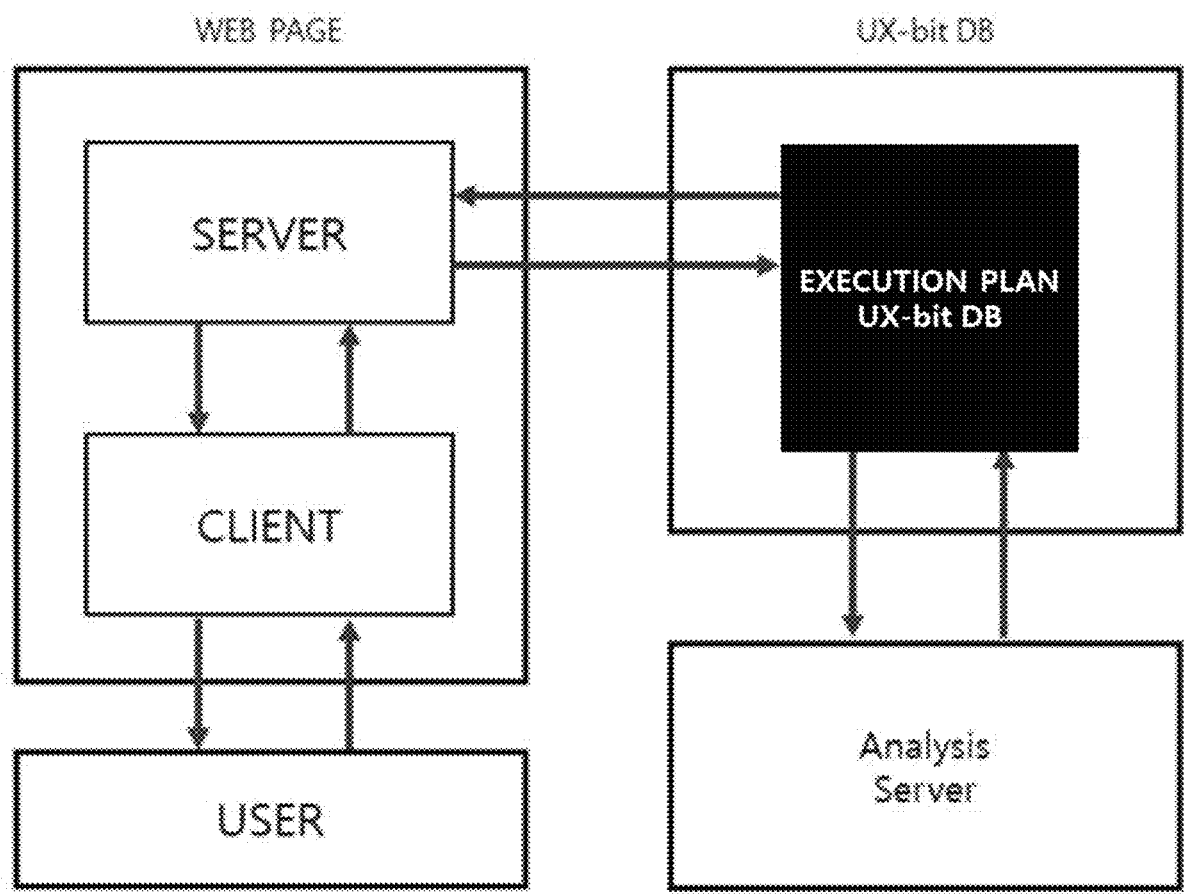
Figure 25:
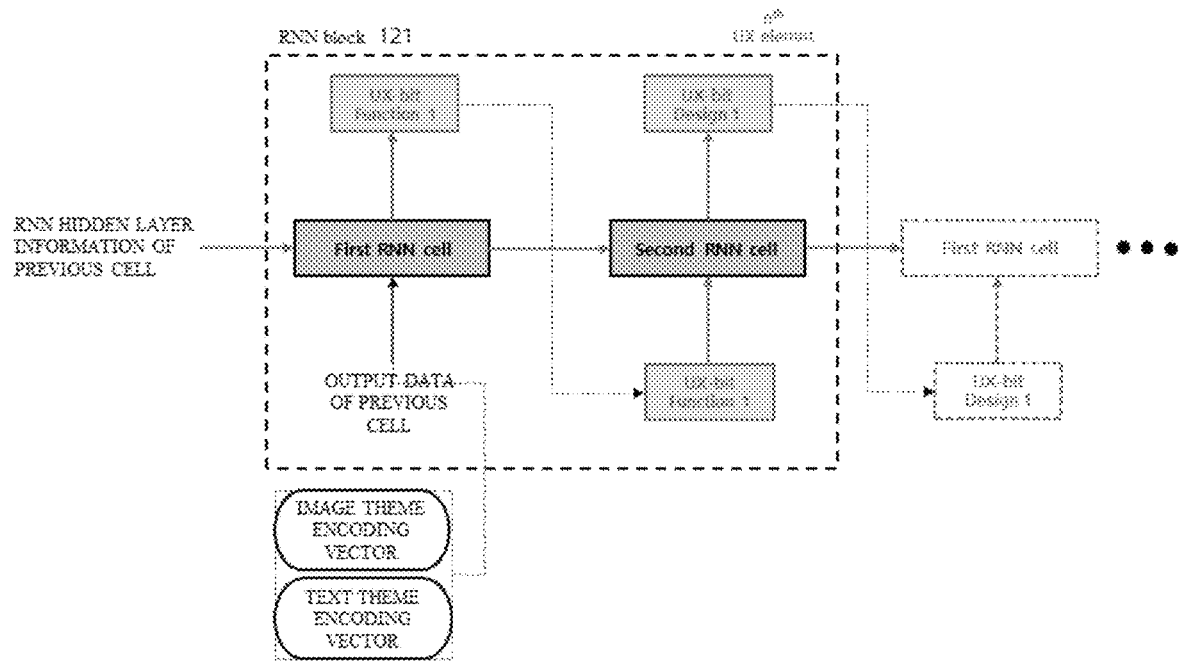
FIG. 25 is a schematic diagram illustrating a recurrent neural network (RNN) module (12) according to one embodiment of the present disclosure.

FIG. 25 is a schematic diagram illustrating the RNN module 12 according to one embodiment of the present disclosure. As shown in FIG. 25, the RNN module 121 according to one embodiment of the present disclosure may include a plurality of RNN blocks, and one RNN block may include a first RNN cell and a second RNN cell. As shown in FIG. 7, the first RNN cell may output UX-bit function attributes of an $n^{th}$ UX element, and the second RNN cell may be configured to output UX-bit design attributes with respect to the UX-bit function attributes of the corresponding $n^{th}$ UX element. When the UX-bit function attribute output from the first RNN cell is "end," the number of UX elements is preset, and the preset number of UX elements is reached, the RNN module 121 according to one embodiment of the present disclosure may end inference when rewards for all actions calculated by the reinforcement learning module 122 are negative numbers. According to the RNN module 121 according to one embodiment of the present disclosure, UX-bit function attributes and UX-bit design attributes are sequentially output according to UX elements, and thus attributes of a UX element generated in a previous step affect attributes of a UX element to be generated in a next step, thereby obtaining an effect in which functions do not entirely overlap each other, and a design allows a unified UX element to be generated.

Figure 26:
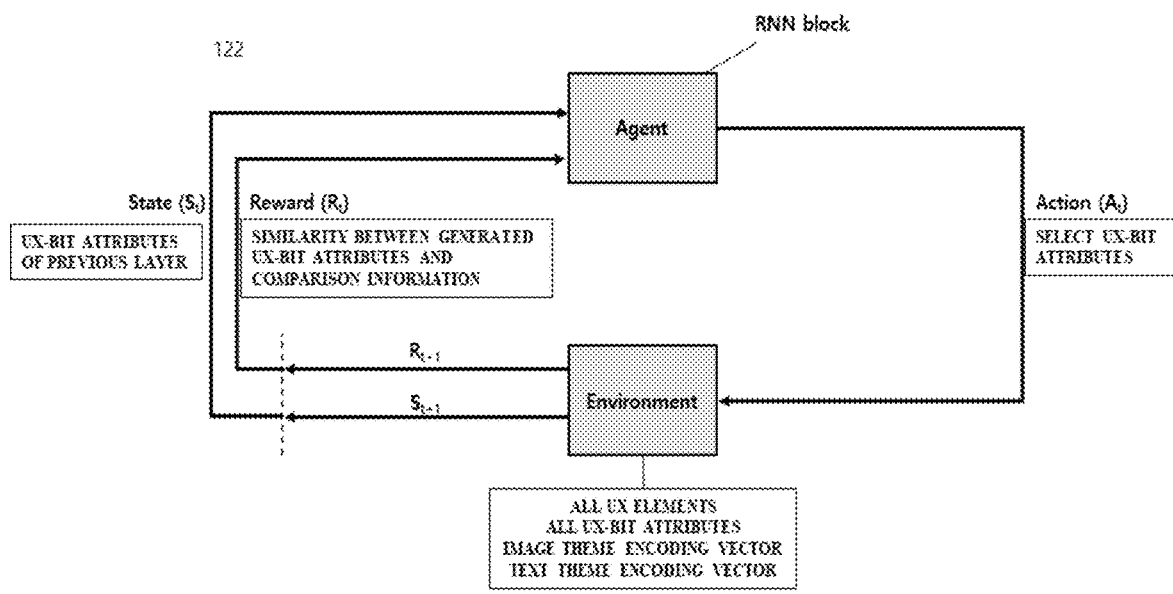
FIG. 26 is a schematic diagram illustrating a reinforcement learning module (122) according to one embodiment of the present disclosure.

The reinforcement learning module 122 which trains the RNN module may be provided such that UX-bit attributes of all pre-generated UX elements, an image theme encoding vector, and a text theme encoding vector are input as an environment, each RNN block of the RNN module 121 is set as an agent, a situation, in which an $n^{th}$ UX element having specific UX-bit function attributes and UX-bit design attributes is virtually included in UX-bit function attributes and UX-bit design attributes of first to $(n-1)^{th}$ elements, is set as a state, in such a state, UX-bit function attributes and UX-bit design attributes output for the $n^{th}$ UX element by the RNN block, which is the agent, are input for an action, and as similarity (for example, cosine similarity) is high between comparison information and UX-bit function attributes and UX-bit design attributes of a UX element ($n^{th}$ UX element) of a current step, which are output data of the current step, or a divergence (for example, a Kullback-Leibler divergence) is small therebetween, a high reward is generated to update a hidden layer of the RNN block which is the agent. FIG. 26 is a schematic diagram illustrating the reinforcement learning module 122 according to one embodiment of the present disclosure. As shown in FIG. 26, the reinforcement learning module 122 may be provided such that UX-bit attributes of all pre-generated UX elements, an image theme encoding vector, and a text theme encoding vector are input as an environment, in a state of a situation in which the RNN block that is an agent virtually includes an $n^{th}$ UX element having specific UX-bit function attributes and UX-bit design attributes in UX-bit function attributes and UX-bit design attributes of first to $(n-1)^{th}$ elements, an action, which outputs UX-bit function attributes and UX-bit design attributes for the $n^{th}$ UX element, is performed, and as similarity (for example, cosine similarity) is high between comparison information (concatenation between an image theme encoding vector and a text theme encoding vector) and UX-bit function attributes and UX-bit design attributes of a UX element ($n^{th}$ UX element) of a current step, which is output data of the current step, or a divergence (for example, a Kullback-Leibler divergence) is small therebetween, a high reward is generated to update a hidden layer of the RNN block which is the agent. The RNN block optimized by the reinforcement learning module 122 according to one embodiment of the present disclosure may be provided such that the hidden layer is fixed.

Thus, there is an effect in which optimal UX-bit attributes corresponding to an image theme encoding vector and a text theme encoding vector are generated to be customized for each UX element by the UX element generation module 120 and the RNN module 121. In addition, without the need to consider the number of all cases of UX-bit function attributes and UX-bit design attributes of all UX elements that can be generated by the UX element generation module 120, the reinforcement learning module 122 is configured to be sequentially optimized for respective UX elements, thereby obtaining an effect in which the number of cases to be calculated by the reinforcement learning module 122 is reduced to reduce computing resources.

Figure 27:
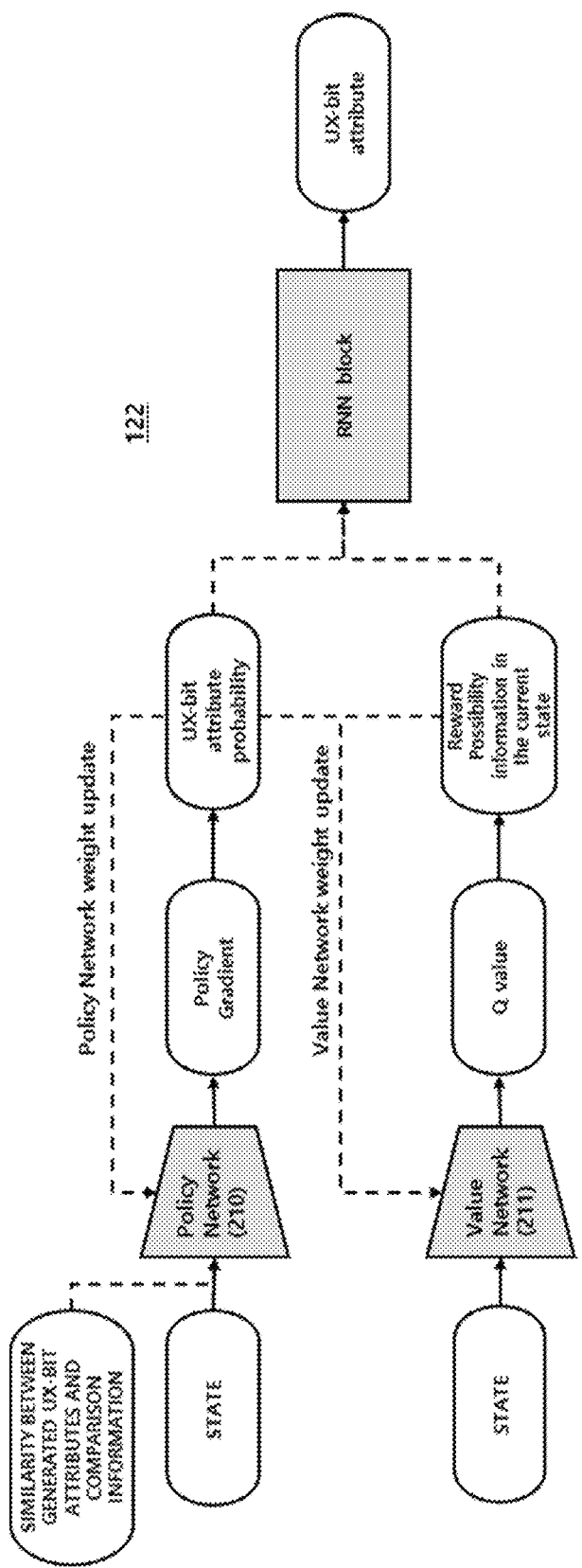
FIG. 27 is a schematic diagram illustrating a reinforcement learning module (122) according to a modified example of the present disclosure.

A reinforcement learning module 122 according to a modified example of the present disclosure may be provided such that an RNN block is updated through more effective reinforcement learning by the following configuration. FIG. 27 is a schematic diagram illustrating the reinforcement learning module 122 according to the modified example of the present disclosure. As shown in FIG. 27, the reinforcement learning module 122 according to the modified example of the present disclosure may include a value network 211 which is an artificial neural network configured to learn a value function for outputting a value in a specific state and a policy network 210 which learns a policy function for outputting a probability of each of UX-bit function attributes and UX-bit design attributes. The policy network 210 and the value network 211 according to the modified example of the present disclosure may be connected to a specific RNN block of the RNN module 121. The policy network 210 and the value network 211 may be connected to the RNN block to output UX-bit attributes for a specific UX element.

The policy network 210 is an artificial neural network which determines a probability of UX-bit function attributes and UX-bit design attributes selected in each state of the reinforcement learning module 122. The policy network 210 learns a policy function to output a probability of the selected UX-bit function attributes and UX-bit design attributes. A cost function of the policy network may be a function obtained by calculating cross entropy by multiplying a policy function by a cost function of the value network and then taking a policy gradient. For example, the cost function of the policy network may be formed as in Equation 1 below. The policy network may be back propagated based on the product of the cross entropy and a time difference error which is the cost function of the value network.

$$-\nabla_\Theta \log \pi_\Theta(a_i|s_i)(r_{i+1}+\gamma V_w(s_{i+1})-V_w(s_i)) \quad \text{[Equation 1]}$$

In Equation 1, $\pi$ may be denote a policy function, $\Theta$ may denote a policy network parameter, $\pi\Theta(a_i|s_i)$ may denote a probability of a specific action being performed (on UX-bit function attributes and UX-bit design attributes) in a current episode, V may denote a value function, w may denote a value network parameter, $s_i$ may denote state information of a current episode i, $S_{i+1}$ may denote state information of a next episode i+1, $r_{i+1}$ may denote a reward expected to be obtained in the next episode, $V_w(s_i)$ may denote reward possibility in the current episode, $V_w(s_{i+1})$ may denote reward possibility in the next episode, and $\gamma$ may denote a depreciation rate. In this case, $r_{i+1}$ may be configured to receive similarity between comparison information (concatenation between an image theme encoding vector and a text theme encoding vector) and UX-bit function attributes and UX-bit design attributes of a UX element of a current step.

Before reinforcement learning is performed, based on UX-bit function attributes and UX-bit design attributes of a previous UX element and performance information according thereto (similarity between comparison information (concatenation between an image theme encoding vector and a text theme encoding vector) and UX-bit function attributes and UX-bit design attributes of a UX element of a current step), the policy network 210 according to one embodiment of the present disclosure learn the basics of a policy by a weight of the policy network being updated through supervised learning. That is, the weight of the policy network may be set through supervised learning based on the UX-bit function attributes and the UX-bit design attributes of the previous UX element, and the performance information. Accordingly, the policy network can be very quickly trained by a history of the UX-bit function attributes and the UX-bit design attributes of the previous UX element.

In addition, according to one embodiment of the present disclosure, during supervised learning of the policy network 210, the supervised learning may be performed based on calculation part type information and parameter information of a previous layer and performance information according thereto in addition to a random vector. For the random vector, for example, a Gaussian distribution may be used. Accordingly, there is an effect in which the policy network can output challenging UX-bit function attributes and UX-bit design attributes with a random probability. When, during the supervised learning of the policy network 210, the supervised learning is performed based on the UX-bit function attributes and the UX-bit design attributes of the previous UX element, and the performance information according thereto, the selection of UX-bit function attributes and UX-bit design attributes of a UX element results in being optimized within a policy of the previous UX element. However, when the random vector is included in the supervised learning of the policy network according to one embodiment of the present disclosure, there is an effect in which, as reinforcement learning is performed, the policy network can learn more effective UX-bit function attributes and UX-bit design attributes than the policy of the previous UX element.

The value network 211 is an artificial neural network which derives a possibility, in which a reward is achieved in each state to which the reinforcement learning module 122 may be changed, and learns a value function. The value network 211 provides a direction in which the RNN block, which is an agent, is to be updated. To this end, an input variable of the value network 211 is set as state information which is information about a state of the reinforcement learning module 122, and an output variable of the value network 211 may be set as reward possibility information which is a possibility of the RNN block achieving a reward (similarity between comparison information (concatenation between an image theme encoding vector and a text theme encoding vector) and UX-bit function attributes and UX-bit design attributes of a UX element of a current step). The reward possibility information according to one embodiment of the present disclosure may be calculated by a Q-function as in Equation below.

$$Q_\pi(s,a)=E_\pi[R_{t+1}+\gamma R_{t+2}+ \ldots |S_t=s, A_t=a] \quad \text{[Equation 2]}$$

In Equation 2 above, $Q_\pi$ may denote entire reward possibility information expected in the future in a case in which a state is s and an action is a in a specific policy $\pi$, R may denote a reward for a specific period, and gamma $\gamma$ may denote a depreciation rate. $S_t$ may denotes a state at a time t, $A_t$ may denote an action at the time t, and E may denote an expected value. Reward possibility information (Q value) according to one embodiment of the present disclosure defines an update direction and size of the policy network 210.

In this case, a cost function of the value network may be a mean square error (MSE) function for a value function and for example, may be formed as in Equation 3 below. The value network 211 may be back propagated based on a time difference error which is the cost function of the value network.

$$(r_{i+1}+\gamma V_w(s_{i+1})-V_w(s_i))^2 \quad \text{[Equation 3]}$$

In Equation 3, V may denote a value function, w may denote a value network parameter, $s_i$ may denote state information of a current episode i, $S_{i+1}$ may denote state information of a next episode i+1, $r_{i+1}$ may denote a reward expected to be obtained in the next episode, $V_w(s_i)$ may denote reward possibility in the current episode, $V_w(s_{i+1})$ may denote reward possibility in the next episode, and y may denote a depreciation rate. In this case, $r_{i+1}$ may be configured to receive similarity between comparison information (concatenation between an image theme encoding vector and a text theme encoding vector) and UX-bit function attributes and UX-bit design attributes of a UX element of a current step.

Accordingly, when a state of the reinforcement learning module 122 is changed, the value network may be updated in a direction in which a gradient of the cost function of Equation 3 descends.

According to one embodiment of the present disclosure, while the value network is trained separately from the policy network, a Q value of the value network is supervised instead of starting randomly, and thus there is an effect in which rapid learning is possible. Accordingly, there is an effect in which it is possible to greatly reduce a burden of exploration in an action of selecting a combination of UX-bit function attributes and UX-bit design attributes having very high complexity.

According to the reinforcement learning module 122 according to one embodiment of the present disclosure, when the policy network 210 that has performed supervised learning selects UX-bit function attributes and UX-bit design attributes of a current episode i, the value network 211 is trained to predict a reward (similarity between comparison information (concatenation between an image theme encoding vector and a text theme encoding vector) and UX-bit function attributes and UX-bit design attributes of a UX element of a current step) when the selected UX-bit function attributes and UX-bit design attributes proceed. The policy network 210 and the value network 211 of the reinforcement learning module 122 which have been trained are combined with a simulation using the RNN block and finally used to select UX-bit function attributes and UX-bit design attributes.

In addition, according to the value network 211 according to one embodiment of the present disclosure, there is an effect in which an update of the policy network that outputs a probability of selected UX-bit function attributes and UX-bit design attribute may be performed every episode. In existing reinforcement learning, there is a problem in that an update of a reinforcement learning model is performed after all episodes are finished, and thus it has been difficult to apply the existing reinforcement learning to an RNN module that sequentially generates UX-bit function attributes and UX-bit design attributes.

The RNN block is a component which searches for optimal UX-bit function attributes and UX-bit design attributes by performing a plurality of simulations on various states and various actions based on a plurality of agents calculated in the policy network and the value network. The RNN block according to one embodiment of the present disclosure may utilize, for example, a Monte Carlo tree search and has a structure in which each node in a tree represents a state, each edge represents a value expected according to a specific action on a corresponding state, and while a current state is set as a root node, a leaf node is expanded whenever a new action is performed to transition to a new state. In the RNN block according to one embodiment of the present disclosure, when optimal UX-bit function attributes and UX-bit design attributes are searched for using the Monte Carlo tree search, the search may be processed through four operations of selection, expansion, evaluation, and backup operations.

The selection operation of the RNN block is an operation in which an action having the highest value among selectable actions is selected and performed until the leaf node expands from the current state. In this case, a value of a value function stored in the edge and a visit frequency value for balancing exploration and use are used. An equation for selecting an action in the selection operation is as follows.

$$a_t=\arg\max_a(Q(s_t,a)+u(s_t,a)) \quad \text{[Equation 4]}$$

In Equation 4 above, at denotes an action at a time t (action of selecting UX-bit function attributes and UX-bit design attributes), $Q(s_t,a)$ denotes a value of a value function stored in a tree, and $u(s_t,a)$ denotes a value inversely proportional to the number of visits of a state-action pair and is used to balance exploration and use.

The expansion operation of the RNN block is an operation of, when a simulation proceeds to a leaf node, adding a new node as a leaf node by acting according to a probability of the policy network trained through supervised learning.

The evaluation operation of the RNN block is an operation of evaluating a value of a leaf node through a value (reward possibility) determined from the newly added leaf node using the value network and a reward obtained by proceeding until an episode of selecting UX-bit function attributes and UX-bit design attributes from a leaf node using the policy network is ended. An equation below is an example of evaluating a value of a new leaf node.

$$V(s_L) = (1-\lambda)v_\theta(S_L) + \lambda z_L \quad \text{[Equation 5]}$$

In Equation 5 above, $V(s_L)$ may denote a value of a leaf node, $\lambda$ may denote a mixing parameter, $v_\theta(s_L)$ may denote a value obtained through the value network, and $z_L$ may denote a reward obtained by continuing a simulation.

The backup operation of the RNN block is an operation of reevaluating a value of nodes visited during a simulation by reflecting the value of the newly added leaf node and updating a visit frequency. An equation below is an example of reevaluating a value and updating a visit frequency.

$$N(s, a) = \sum_i 1(s, a, i) \quad \text{[Equation 6]}$$

$$Q(s, a) = \frac{1}{N(s, a)} \sum_i 1(s, a, i) V(S_L^i)$$

In Equation 6 above, $s^i_L$ may denote a leaf node in an $i^{th}$ simulation, and $1(s,a,i)$ may denote whether an edge $(s,a)$ is visited in the $i^{th}$ simulation. When a tree search is completed, an algorithm may be configured to select the most visited edge $(s,a)$ from a root node. According to the RNN block according to one embodiment of the present disclosure, there is an effect in which a plurality of simulations can be performed in advance on a plurality of UX-bit function attributes and UX-bit design attributes selected by the policy network based on the value network to select optimal UX-bit function attributes and UX-bit design attributes.

According to one embodiment of the present disclosure, the reinforcement learning module 122 may be provided such that a plurality of agents are provided. There is an effect in which, when the plurality of agents are provided, UX-bit function attributes and UX-bit design attributes selected by the reinforcement learning module 122 may compete with each other for a specific state and each of specific UX-bit function attributes and UX-bit design attributes to select the most optimal UX-bit function attributes and UX-bit design attributes.

Figure 28:
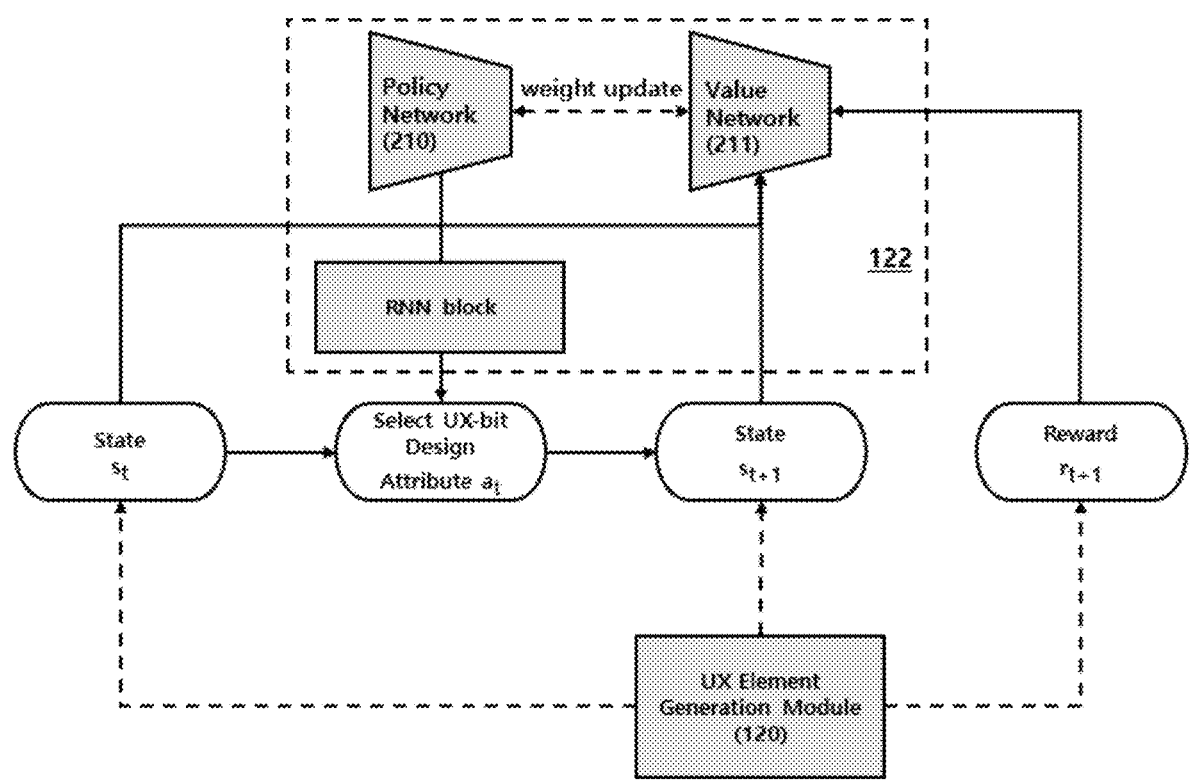
FIG. 28 is a flowchart illustrating an operation example of a reinforcement learning module (122) according to one embodiment of the present disclosure.

FIG. 28 is a flowchart illustrating an operation example of the reinforcement learning module 122 according to one embodiment of the present disclosure. As shown in FIG. 28, when a state s(t) is input by the UX element generation module 120, various UX-bit function attributes and UX-bit design attributes are input to the RNN block by a plurality of agents of the policy network 210 through the value network 211, and UX-bit function attributes and UX-bit design attributes are selected by a probability a(t) of selected UX-bit function attributes and UX-bit design attributes which is an action output by the RNN block, an episode t is ends, and an episode t+1 starts. In the episode t+1, a state change s(t+1) by a(t) is input again by the UX element generation module 120, and a reward r(t+1) according to a(t) is immediately input to update the value network 211 and the policy network 210.

Figure 29:
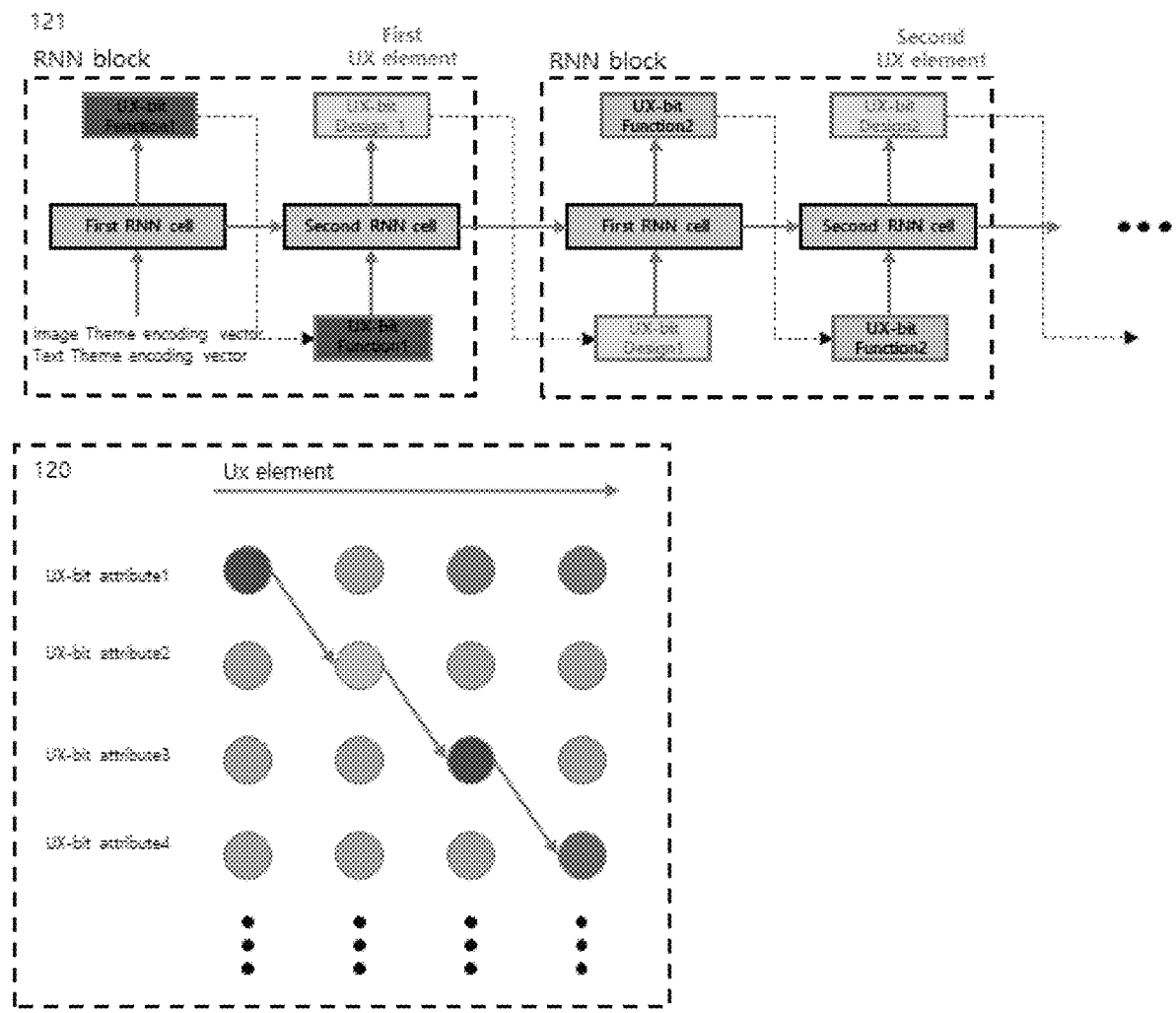
FIG. 29 is a schematic diagram illustrating automatic generation of UX-bit attributes of a UX-bit generation module (12) according to one embodiment of the present disclosure.

Regarding an operation example of the UX-bit generation module 12, FIG. 29 is a schematic diagram illustrating automatic generation of UX-bit attributes of the UX-bit generation module 12 according to one embodiment of the present disclosure. As shown in FIG. 29, for example, one RNN block may be provided with respect to one UX element, an image theme encoding vector and a text theme encoding vector may be input to a first RNN cell of a first RNN block, UX-bit function 1 among UX-bit function attributes may be output for a first UX element, previously output UX-bit function 1 may be input to a second RNN cell of the first RNN block, UX-bit design 1 among UX-bit design attributes may be output for the first UX element to generate UX-bit attributes for the first UX element, UX-bit design 1 previously output for the first UX element may be input to a first RNN cell of a second RNN block, UX-bit function 2 among the UX-bit function attributes may be output for the second UX element, previously output UX-bit function 2 may be input to a second RNN cell of the second RNN block, and UX-bit design 2 among UX-bit design attributes may be output to generate UX-bit attributes for the second UX element.

An IA generation module 13 is a module which generates an IA based on UX-bit attributes (UX-bit function attributes and UX-bit design attributes) of a plurality of UX elements generated by the UX-bit generation module 12. The IA generated by the IA generating module 13 may be generated as shown in FIGS. 14 and 15.

A wireframe generation module 14 is a module which generates a wireframe based on UX-bit attributes (UX-bit function attributes and UX-bit design attributes) of a plurality of UX elements generated by the UX-bit generation module 12. The wireframe generated by the wireframe generation module 14 may be generated as shown in FIG. 16.

A design generation module 15 is a module which outputs design data as output data using an image theme encoding vector, a text theme encoding vector, and X-bit attributes (UX-bit function attributes and UX-bit design attributes) of a plurality of UX elements generated by the UX-bit generation module 12 as input data. The design data generated by the design generation module 15 may refer to a graphic design of a web/app page or the like in which design elements are formed in a wireframe.

Figure 30:
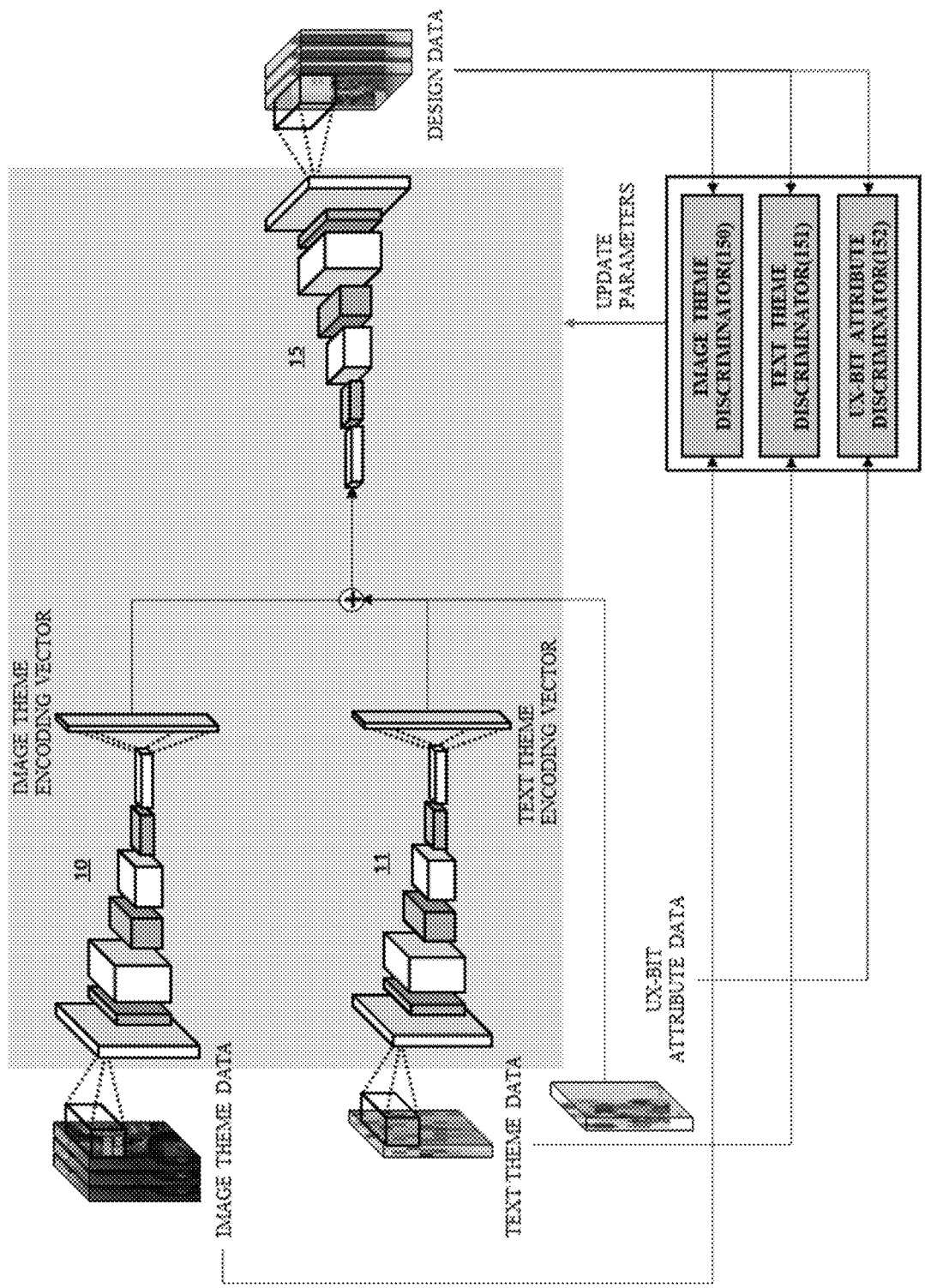
FIG. 30 is a schematic diagram illustrating a the structure of a design generation module (15) according to one embodiment of the present disclosure.

Regarding a specific configuration of the design generation module 15, FIG. 30 is a schematic diagram illustrating a structure of the design generation module 15 according to one embodiment of the present disclosure. As shown in FIG. 30, the design generation module 15 may be composed of an artificial neural network in which a concatenated vector obtained by concatenating an image theme encoding vector, a text theme encoding vector, and UX-bit attribute data by being connected to the image theme encoding module 10, the text theme encoding module 11 and the UX-bit generation module 12 are input as input data of the design generation module 15, design data is output as output data, and in a learning session, parameters are updated by an image theme discriminator 150, a text theme discriminator 151, and a UX-bit attribute discriminator 152.

Regarding an overall embodiment of the image theme encoding module 10, the text theme encoding module 11, and the design generation module 15, for example, the image theme encoding module 10 according to one embodiment of the present disclosure may be composed of a ConvNet including a plurality of consecutive convolution layers, pooling layers, and fully connected layers that receive image theme data standardized in a specific dimension as input data and encode an image theme encoding vector, which is a latent variable of 1×1×k, as output data. In addition, the image theme encoding module 10 may form a skip connection structure with the design generation module 15. The text theme encoding module 11 may be composed of a ConvNet including a plurality of consecutive convolution layers, pooling layers, and fully connected layers that divide and input text theme data based on phonemes and encode a text theme encoding vector, which is a latent variable of 1×1×k, as output data. In addition, the text theme encoding module 11 may form a skip connection structure with the design generation module 15.

In a learning session of the image theme encoding module 10, image theme data input to the image theme encoding module 10 according to one embodiment of the present disclosure may be input in a channel-wise concatenation structure for each convolution layer of the image theme encoding module 10 and the design generation module 15. In this case, due to a configuration in which the image theme data is input in the channel-wise concatenation structure for each convolution layer of the image theme encoding module 10 and the design generation module 15, in a learning session of the image theme encoding module 10 and the design generation module 15, a vanishing gradient is improved, feature propagation is strengthened, and the number of parameters is saved, thereby obtaining an effect of reducing computing resources.

In a learning session of the design generation module 15, parameters of the design generation module 15 may be updated in a direction in which a representative design loss composed of a difference between design data and corresponding reference data (ground truth) is reduced. A representative design loss, which is one of loss functions of the design generation module 15, may also include a mean square loss, a cross entropy loss, and the like and for example, may be as follows.

$$L_c = \frac{1}{N}\sum_{i=1}^{N}\|L_g - L_G\|_2 \qquad \text{[Equation 7]}$$

In Equation above, $L_c$ may denotes a representative design loss, N may be the number of pairs of design data and reference data (batch size), i may denote a specific image pair among N pairs of design data and reference data, $L_g$ may denote the design data, $L_G$ may denote the reference data as a ground truth, and $\|\;\|_2$ may denote $L_2$-norm. In this case, the reference data in the representative design loss may refer to a web/app design reference of which similarity with an image theme encoding vector and similarity with a text theme encoding vector are greater than or equal to a specific level among pre-stored encoding vectors of a web/app design.

The image theme discriminator 150 is a module used in a learning session of the design generation module 15 and an artificial neural network module which is pre-trained to receive design data output from the design generation module 15 and image theme data that is a reference (ground truth) and output an image theme discrimination vector for distinguishing between the image theme data and the design data. The image theme discriminator 150 according to one embodiment of the present disclosure may include a CONCAT function and a plurality of convolution layers. The image theme discriminator 150 may be pre-trained separately from the design generation module 15, may be used in a learning session of the design generation module 15 in a state of being pre-trained (state in which parameters are fixed), and may be configured to output an image theme discrimination vector in an image theme discrimination loss included in a loss function of the design generation module 15 in the learning session of the design generation module 15.

In a learning session of the image theme discriminator 150, the learning session may have a configuration in which (real-labeled) image theme data and (fake-labeled) design data output from the design generation module 15 are input to the image theme discriminator 150, the image theme discriminator 150 outputs an image theme discrimination vector for distinguishing between real and fake of the design data, wherein the image theme discrimination vector may include a real class and a fake class or include only a real class, and parameters of a ConvNet of the image theme discriminator 150 are updated in a direction in which a loss including a difference between the image theme discrimination vector and an actual (real or fake) label of the design data is reduced.

That is, in a learning session of the image theme discriminator 150, the learning session may have a configuration in which parameters of the image theme discriminator 150 are updated such that an image theme discrimination vector $D_i(x,y)$ in a distribution of design data in which image theme data is set as a reference becomes minimum (0), and an image theme discrimination vector $D_i(y,y)$ in an image theme data distribution, which is a ground truth distribution corresponding thereto, becomes maximum (1). For example, a loss included in a loss function of the image theme discriminator 150 may be as follows.

$$L_i = E_{x \sim L_g, y \sim L_G}[\log(1-D_i(x,y))] + E_{y \sim L_G}[\log(D_i(y,y))] \qquad \text{[Equation 8]}$$

In Equation above, $L_i$ denotes a loss of the image theme discriminator, x denotes design data, y denotes image theme data that is reference data as a ground truth, $y \sim L_G$ denotes a distribution of the reference data, $x \sim L_g$ denotes a distribution of the design data, and $D_i(x,y)$ denotes an image theme discrimination vector (probability value between 0 and 1) output from the image theme discriminator 150 when the design data is input using the image theme data as a reference. $D_i(y,y)$ denotes an image theme discrimination vector (probability value between 0 and 1) output from the image theme discriminator 150 when the image theme data is input as a reference. In a learning session of the image theme discriminator 150, when it is determined that the design data output by the design generation module 15 is a design that is not similar to the image theme data, the image theme discriminator 150, the loss of the image theme discriminator is output such that $D_i(x,y)$ is close to 0, and $L_i$ is close to 0 (minimum value), and when it is determined that the design data is a design that is similar to the image theme data, the loss of the image theme discriminator is output such that $D_i(x,y)$ is close to 1, and $L_i$ is close to ∞ (maximum value), which may be applied to learning (parameter update) of the image theme discriminator 150. In addition, parameters of the image theme discriminator 150 may be updated in a direction in which $D_i(y,y)$ approaches 1. Regarding a learning session of the image theme discriminator 150, the learning session of the image theme discriminator 150 may have a configuration in which learning data labeled as synthesized in the design generation module 15 and learning data labeled as not synthesized are provided as leaning data of the image theme discriminator 150, the learning data is input to the image theme discriminator 150 to output an image theme discrimination vector, a loss of the learning data is calculated based on the image theme discrimination vector, and parameters of the image theme discriminator 150 are updated in a direction in which the calculated loss of the image theme discriminator is minimized.

Regarding an operational relationship of the image theme discriminator 150 in a learning session of the design generation module 15, a loss function of the design generation module 15 may include an image theme discrimination vector output when design data is input to the image theme discriminator 150 as input data. In the loss function of the design generation module 15, for example, an image theme discrimination vector may be provided as a loss (hereinafter referred to as image theme determination loss) as follows.

$$L_{di}=E_{x \sim L_g, y \sim L_G}[\log(D_i(x,y))] \quad \text{[Equation 9]}$$

In Equation above, $L_i$ denotes an image theme discrimination loss, x denotes design data, y denotes image theme data, $y \sim L_G$ denotes a distribution of reference data, and $D_i(x,y)$ denotes an image theme discrimination vector (probability value between 0 and 1) output from the image theme discriminator 150 when the design data is input using the image theme data as a reference. In a learning session of the design generation module 15 performed by the image theme discriminator 150, the learning session may have a configuration in which the image theme discrimination loss including the image theme discrimination vector is included in a loss function of the design generation module 15, and parameters of the design generation module 15 are updated such that the image theme discrimination vector $D_i(x,y)$ in a distribution of the design data becomes maximum (1) and thus $L_{di}$ becomes 0 (minimum value) (such that it is determined that the design data is a design that is similar to the image theme data).

The text theme discriminator 151 is a module used in a learning session of the design generation module 15 and an artificial neural network module which is pre-trained to receive design data output from the design generation module 15 and text theme data that is a reference (ground truth) and output a text theme discrimination vector for distinguishing between the text theme data and the design data. The text theme discriminator 151 according to one embodiment of the present disclosure may include a CONCAT function and a plurality of convolution layers. The text theme discriminator 151 may be pre-trained separately from the design generation module 15, may be used in a learning session of the design generation module 15 in a state of being pre-trained (state in which parameters are fixed), and may be configured to output a text theme discrimination vector in a text theme discrimination loss included in a loss function of the design generation module 15 in the learning session of the design generation module 15.

In a learning session of the text theme discriminator 151, the learning session may have a configuration in which a (real-labeled) text theme encoding vector that is an encoding vector of text theme data and a (fake-labeled) design encoding data that is an encoding vector of design data output from the design generation module 15 are input to the text theme discriminator 151, the text theme discriminator 151 outputs a text theme discrimination vector for distinguishing between real and fake of the design data (distinguishing between the text theme data and the design data), wherein the text theme discrimination vector may include a real class and a fake class or include only a real class, and parameters of a ConvNet of the text theme discriminator 151 are updated in a direction in which a loss including a difference between the text theme discrimination vector and an actual (real or fake) label of the design data is reduced.

That is, in a learning session of the text theme discriminator 151, the learning session may have a configuration in which parameters of the text theme discriminator 151 are updated such that a text theme discrimination vector $D_t(x,z)$ in a distribution of design data in which a text theme encoding vector is set as a reference becomes minimum (0), and a text theme discrimination vector $D_t(z,z)$ in a distribution of a text theme encoding vector of text theme data, which is a ground truth distribution corresponding thereto, becomes maximum (1). For example, a loss included in a loss function of the text theme discriminator 151 may be as follows.

$$L_t=E_{x \sim L_g, z \sim L_G}[\log(1-D_t(x,z))]+E_{z \sim L_G}[\log(D_t(z,z))] \quad \text{[Equation 10]}$$

In Equation above, $L_i$ denotes a loss of the text theme discriminator, x denotes an encoding vector of design data, z denotes a text theme encoding vector that is reference data as a ground truth, $z \sim L_G$ denotes a distribution of the reference data, $x \sim L_g$ denotes a distribution of the encoding vector of the design data, and $D_t(x,z)$ denotes a text theme discrimination vector (probability value between 0 and 1) output from the text theme discriminator 151 when the encoding vector of the design data is input using the text theme encoding vector as a reference. $D_t(z,z)$ denotes a text theme discrimination vector (probability value between 0 and 1) output from the text theme discriminator 151 when the text theme encoding vector is input as a reference. In a learning session of the text theme discriminator 151, when it is determined that the encoding vector of the design data output by the design generation module 15 is not similar to the text theme encoding vector which is an encoding vector of text theme data, the loss of the text theme discriminator is output such that $D_t(x,z)$ is close to 0, and $L_t$ is close to 0 (minimum value), and when it is determined that the encoding vector of the design data is similar to the theme encoding vector, the loss of the text theme discriminator is output such that $D_t(x,z)$ is close to 1, and $L_t$ is close to ∞ (maximum value), which may be applied to learning (parameter update) of the text theme discriminator 151. In addition, parameters of the text theme discriminator 151 may be updated in a direction in which $D_t(z,z)$ approaches 1. Regarding a learning session of the text theme discriminator 151, the learning session of the text theme discriminator 151 may have a configuration in which learning data labeled as synthesized in the design generation module 15 and learning data labeled as not synthesized are provided as leaning data of the text theme discriminator 151, the learning data is input to the text theme discriminator 151 to output a text theme discrimination vector, a loss of the learning data is calculated based on the text theme discrimination vector, and parameters of the text theme discriminator 151 are updated in a direction in which the calculated loss of the text theme discriminator is minimized.

Alternatively, regarding a modified example of a loss of the text theme discriminator 151, a loss included in a loss function of the text theme discriminator 151 may also include a mean square loss, a cross entropy loss, and the like. For example, when a binary cross entropy loss is applied, the loss may be as follows.

$$L_t = \frac{1}{N}\sum_{i=1}^{N} -\log\left(\frac{v_i \cdot s_i}{\|v_i\|_2 \cdot \|s_i\|_2}\right) \quad \text{[Equation 11]}$$

In Equation above, $L_t$ may denote a loss of the text theme discriminator, N may be the number of pairs of text theme encoding vectors and design encoding vectors (batch size), i may denote a specific pair of N pairs of text theme encoding vectors and design encoding vectors, and v may denote the design encoding vector, s may denote the text theme encoding vector, and $\| \|_2$ may denote $L_2$-norm Regarding an operational relationship of the text theme discriminator 151 in a learning session of the design generation module 15, a loss function of the design generation module 15 may include a text theme discrimination vector output when a text theme encoding vector is input to the text theme discriminator 151 as input data. In the loss function of the design generation module 15, for example, the text theme discrimination vector may be provided as a loss (hereinafter referred to as text theme determination loss) as follows.

$$L_{dt} = E_{x \sim L_g, z \sim L_G}[\log(D_t(x,z))] \quad \text{[Equation 12]}$$

In Equation above, $L_{dt}$ denotes a text theme discrimination loss, x denotes an encoding vector of design data, $x \sim L_g$ denotes a distribution of the encoding vector of the design data, z denotes a text theme encoding vector, $z \sim L_G$ denotes a distribution of the text theme encoding vector, and $D_t(x,z)$ denotes a text theme discrimination vector (probability value between 0 and 1) output from the text theme discriminator 150 when the encoding vector of the design data is input using the text theme encoding vector as a reference. In a learning session of the design generation module 15 performed by the text theme discriminator 151, the learning session may have a configuration in which the text theme discrimination loss including the text theme discrimination vector is included in a loss function of the design generation module 15, and parameters of the design generation module 15 are updated such that the text theme discrimination vector $D_t(x,z)$ in the distribution of the encoding vector of the design data becomes maximum (1) and thus $L_{dt}$ becomes 0 (minimum value) (such that it is determined that the encoding vector of the design data is similar to the text theme encoding vector).

Regarding the UX-bit attribute discriminator 152, the UX-bit attribute discriminator 152 is a module used in a learning session of the design generation module 15 and is an artificial neural network module which is pre-trained to receive design data output from the design generation module 15 and UX-bit attribute data (reference as a ground truth) output from the UX-bit generation module 12 and output a UX-bit attribute discrimination vector for distinguishing between the design data and the UX-bit attribute data. The UX-bit attribute discriminator 152 according to one embodiment of the present disclosure may include a CONCAT function and a plurality of convolution layers. The UX-bit attribute discriminator 152 may be pre-trained separately from the design generation module 15, may be used in a learning session of the design generation module 15 in a state of being pre-trained (state in which parameters are fixed), and may be configured to output a UX-bit attribute discrimination vector in a UX-bit discrimination loss included in a loss function of the design generation module 15 in the learning session of the design generation module 15.

In a learning session of the UX-bit attribute discriminator 152, the learning session may have a configuration in which a (real-labeled) encoding vector of UX-bit attribute data and a (fake-labeled) design encoding vector that is a design encoding vector of design data output from the design generation module 15 are input to the UX-bit attribute discriminator 152, the UX-bit attribute discriminator 152 outputs a UX-bit attribute discrimination vector for distinguishing between real data and fake of the design data, wherein the UX-bit attribute discrimination vector may include a real class and a fake class or include only a real class, and parameters of a ConvNet of the UX-bit attribute discriminator 152 are updated in a direction in which a loss including a difference between the UX-bit attribute discrimination vector and an actual (real or fake) label of the design data is reduced.

That is, in a learning session of the UX-bit attribute discriminator 152, the learning session may have a configuration in which parameters of the UX-bit attribute discriminator 152 are updated such that a UX-bit attribute discrimination vector $D_{ux}(x,u)$ in a distribution of an encoding vector of design data in which an encoding vector of UX-bit attribute data is set as a reference becomes minimum (0), and a UX-bit attribute discrimination vector $D_{ux}(u,u)$ in a distribution of an encoding vector of UX-bit attribute data, which is a ground truth distribution corresponding thereto, becomes maximum (1). For example, a loss included in a loss function of the UX-bit attribute discriminator 152 may be as follows.

$$L_{ux} = E_{x \sim L_g, u \sim L_G}[\log(1 - D_{ux}(x,u))] + E_{u \sim L_G}[\log(D_{ux}(u,u))] \quad \text{[Equation 13]}$$

In Equation above, $L_{ux}$ denotes a loss of the UX-bit attribute discriminator, x denotes an encoding vector of design data, u denotes an encoding vector of UX-bit attribute data which is reference data as a ground truth, $u \sim L_G$ denotes a distribution of the reference data, $x \sim L_g$ denotes the distribution of the encoding vector of the design data, and $D_{ux}(x,u)$ denotes a UX-bit attribute discrimination vector (probability value between 0 and 1) output from the UX-bit attribute discriminator 152 when the encoding vector of the design data is input using the encoding vector of the UX-bit attribute data as a reference. $D_{ux}(u,u)$ denotes a UX-bit attribute discrimination vector (probability value between 0 and 1) output from the UX-bit attribute discriminator 152 when the encoding vector of the UX-bit attribute data is input using the encoding vector of the UX-bit attribute data as a reference. In a learning session of the UX-bit attribute discriminator 152, when it is determined that the encoding vector of the design data output by the design generation module 15 is not similar to the encoding vector of the UX-bit attribute data, the loss of the UX-bit attribute discriminator 152 is output such that $D_{ux}(x,u)$ is close to 0, and $L_{ux}$ is close to 0 (minimum value), and when it is determined that the encoding vector of the design data is similar to the encoding vector of the UX-bit attribute data, the loss of the UX-bit attribute discriminator 152 is output such that $D_{ux}(x,u)$ is close to 1, and $L_{ux}$ is close to ∞ (maximum value), which may be applied to learning (parameter update) of the UX-bit attribute discriminator 152. In addition, parameters of the UX-bit attribute discriminator 152 may be updated in a direction in which $D_{ux}(u,u)$ approaches 1. Regarding a learning session of the UX-bit attribute discriminator 152, the learning session of the UX-bit attribute discriminator 152 may have a configuration in which learning data labeled as synthesized in the design generation module 15 and learning data labeled as not synthesized are provided as leaning data of the UX-bit attribute discriminator 152, the learning data is input to the UX-bit attribute discriminator 152 to output a UX-bit attribute discrimination vector, a loss of the learning data is calculated based on the UX-bit attribute discrimination vector, and parameters of the UX-bit attribute discriminator 152 are updated in a direction in which a calculated loss of the UX-bit attribute discriminator 152 is minimized. Alternatively, regarding a modified example of a loss of the UX-bit attribute discriminator 152, a loss included in a loss function of the UX-bit attribute discriminator 152 may also include a mean square loss, a cross entropy loss, and the like.

Regarding an operational relationship of the UX-bit attribute discriminator 152 in a learning session of the design generation module 15, a loss function of the design generation module 15 may include a UX-bit attribute discrimination vector output when an encoding vector of UX-bit attribute data is input to the UX-bit attribute discriminator 152 as input data. In the loss function of the design generation module 15, for example, the UX-bit attribute discrimination vector may be provided as a loss (hereinafter referred to as UX-bit attribute discrimination loss) as follows.

$$L_{dux} = E_{x \sim L_g, u \sim L_G}[\log(D_{ux}(x,u))] \quad \text{[Equation 14]}$$

In Equation above, $L_{dux}$ denotes a UX-bit attribute discrimination loss, x denotes an encoding vector of design data, $x \sim L_g$ denotes a distribution of the encoding vector of the design data, u denotes an encoding vector of UX-bit attribute data, $z \sim L_G$ denotes a distribution of the encoding vector of the UX-bit attribute data, and $D_{ux}(x,u)$ denotes a UX-bit attribute discrimination vector (probability value between 0 and 1) output from the UX-bit attribute discriminator 152 when the encoding vector of the design data is input as input data using the encoding vector of the UX-bit attribute data as a reference. In a learning session of the design generation module 15 performed by the UX-bit attribute discriminator 152, the learning session may have a configuration in which the UX-bit attribute determination loss including the UX-bit attribute discrimination vector is included in a loss function of the design generation module 15, and parameters of the design generation module 15 are updated such that the UX-bit attribute discrimination vector $D_{ux}(x,u)$ in the distribution of the encoding vector of the design data becomes maximum (1) and thus $L_{dux}$ becomes 0 (minimum value) (such that it is determined that the encoding vector of the design data is similar to the encoding vector of the UX-bit attribute data).

Figure 31:
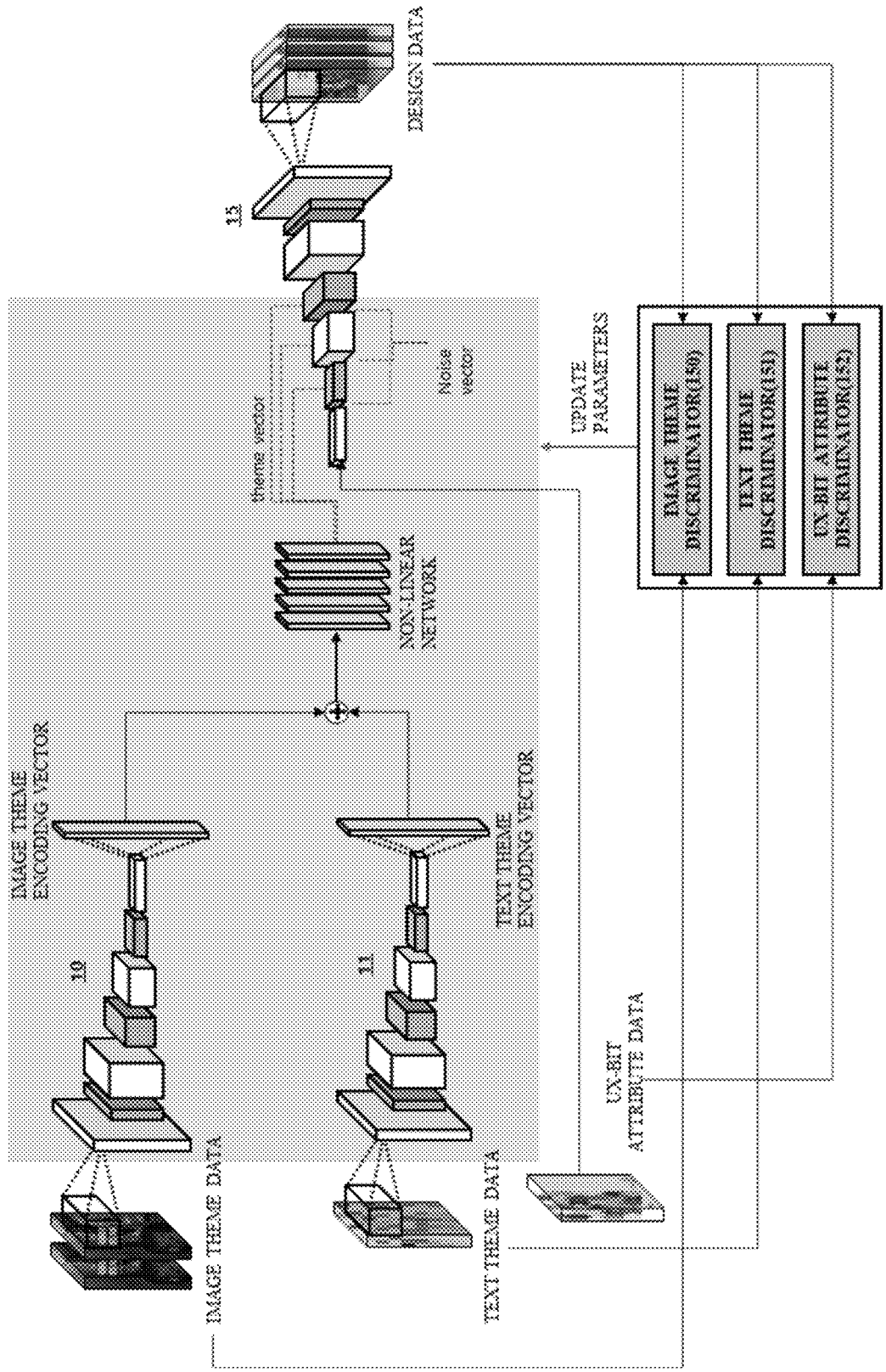
FIG. 31 is a schematic diagram illustrating an operational relationship of a design generation module (15) according to another embodiment of the present disclosure.

Regarding another embodiment of the design generation module 15, FIG. 31 is a schematic diagram illustrating an operational relationship of the design generation module 15 according to another embodiment of the present disclosure. As shown in FIG. 31, the design generation module 15 according to another embodiment of the present disclosure may be connected to a nonlinear network. The linear network is a network having a nonlinear structure in which a plurality of fully connected (FC) layers are consecutively connected. The design generation module 15 is a module which receives a concatenated vector, which is obtained by concatenating an image theme encoding vector and a text theme encoding vector, as input data, outputs a theme vector as output data, and inputs the output theme vector to a plurality of layers in a network of the design generation module 15 for each scale. In this case, rather than a concatenated vector obtained by concatenating the image theme encoding vector, the text theme encoding vector, and UX-bit attribute data, UX-bit attribute data is applied as the input data of the design generation module 15, and a noise vector is input to each layer having a scale to which a theme vector is input. Accordingly, since a data distribution of the image theme encoding vector and the text theme encoding vector does not limit a data distribution of the design generation module 15, and concurrently, a data distribution of the UX-bit attribute data limits the data distribution of the design generation module 15, it is strict on the UX-bit attribute data, and a degree of freedom is increased from an image theme and a text theme given by a practitioner, thereby obtaining an effect in which various designs can be generated in a fixed wireframe.

Figure 32:
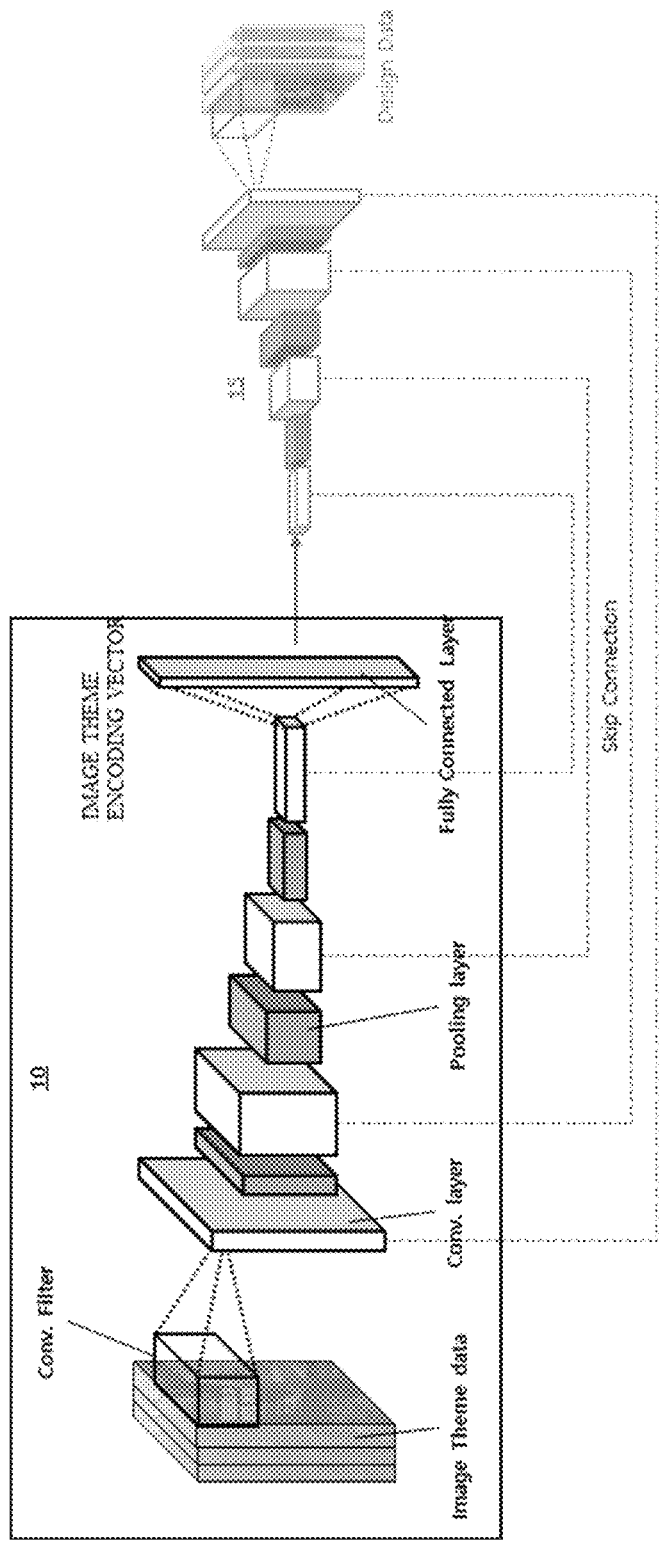
FIG. 32 is a schematic diagram illustrating a skip connection of a design generation module (15) according to one embodiment of the present disclosure.

Regarding a skip connection of the design generation module 15, FIG. 32 is a schematic diagram illustrating the skip structure of the design generation module 15 according to one embodiment of the present disclosure. As shown in FIG. 32, the skip connection of the design generation module 15 refers to a structure in which the image theme encoding module 10 and the design generation module 15 are connected through an image theme encoding vector, and also a specific layer of the image theme encoding module 10 and a specific layer of the design generation module 15 are additionally connected through addition logic. Accordingly, there is an effect in which gradient vanishing and exploding problems are reduced, and since only the residual of how much change from a previous layer needs to be calculated, there is an effect in which computing resources are reduced.

Figure 33:
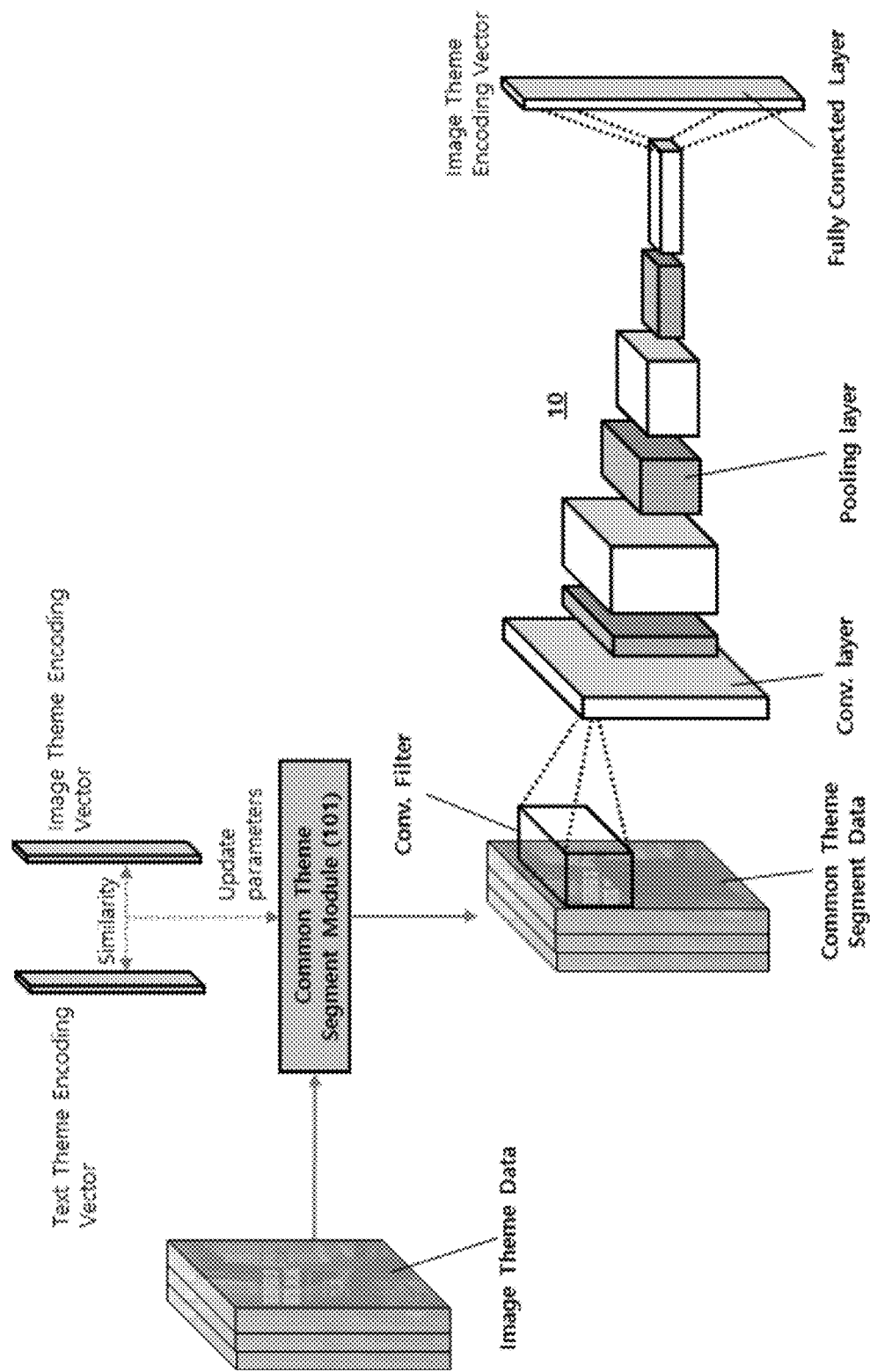
FIG. 33 is a schematic diagram illustrating a common theme segment module (101) according to another embodiment of the present disclosure.

Regarding another embodiment of the theme encoding module 10, FIG. 33 is a schematic diagram illustrating a common theme segment module 101 according to another embodiment of the present disclosure. As shown in FIG. 33, the image theme encoding module 10 may be provided to be connected to the common theme segment module 101. The common theme segment module 101 may be a module which receives image theme data 100 as input data and common theme segment data as output data and may be provided such that parameters of the common theme segment module 101 are updated in a direction in which similarity between a text theme encoding vector and an image theme encoding vector is increased. As a network structure of the common theme segment module 101 according to one embodiment of the present disclosure, a structure of a Fully Convolutional Network (FCN) by J. Long et al. (2015), a ParseNet by W. Liu et al. (2015), a Convolutional and Deconvolutional Networks by H. Noh et al. (2015), or a U-Net by Ronneberger et al. (2015) may be applied. Accordingly, not all of image theme data input by a practitioner is used to generate design data, but only a part of the image theme data related to text theme data is segmented and used to generate design data, thereby obtaining an effect in which the design generation module 15 generates a design that is more relevant to an intention of an operator.

Through an organic combination of a configuration of an automatic design generating artificial neural network device 1 and a configuration of UX-bits according to one embodiment of the present disclosure as described above, there are effects in which UX-bit attributes can be defined by a practitioner simply inputting image theme data which is an image corresponding to a concept and a theme of a design to be generated and simply inputting text theme data which is text corresponding to the concept and theme of the design to be generated, and an IA, a wireframe, and a web/app design can be generated.

As described above, those skilled in the art to which the present disclosure pertains will understand that the present disclosure may be implemented in other detailed forms without changing the technical spirit or indispensable characteristics of the present disclosure. Accordingly, it will be understood that the above-described embodiments are illustrative and not limitative from all aspects. The scope of the present disclosure is defined by the appended claims rather than the detailed description, and the present disclosure should be construed as covering all modifications or variations derived from the meaning and scope of the appended claims and their equivalents.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes and may not have been selected to delineate or limit the subject matter of the invention.

The above description of embodiments of the present disclosure has been presented for purposes of illustration It is not intended to limit the present disclosure to the disclosed precise form or to describe the present disclosure without omission. Those skilled in the art can appreciate that many modifications and variations are possible in consideration of the above disclosure.

Therefore, the scope of the present disclosure is not limited by the detailed description and is limited by any claims of the application based thereon. Accordingly, the disclosure of embodiments of the present disclosure is illustrative and does not limit the scope of the present disclosure set forth in the claims below.

The invention claimed is:

1. An automatic design generating artificial neural network device using a user experience (UX)-bit, comprising:
    an image theme encoding module that is an encoding module which receives image theme data, which is an image representing a theme of a web/app graphic design to be generated by a practitioner, as input data, and outputs an image theme encoding vector as output data;
    a text theme encoding module that is an encoding module which receives text theme data, which is text representing the theme of the web/app graphic design to be generated by the practitioner, as input data, and outputs a text theme encoding vector as output data;
    a UX-bit generation module that is a module which receives the image theme encoding vector and the text theme encoding vector as input data and outputs UX-bit attributes of a plurality of UX elements as output data;
    a design generation module that is an upsampling artificial neural network module which receives the image theme encoding vector, the text theme encoding vector, and the UX-bit attribute as input data and outputs design data indicating a specific web/app graphic design as output data;
    an image theme discriminator that is a module used in a learning session of the design generation module and is a pre-learned artificial neural network module which, when the design data and the image theme data are input as input data, outputs an image theme discrimination vector, which indicates a probability of similarity between the design data and the image theme data, as output data;
    a text theme discriminator that is a module used in the learning session of the design generation module and is a pre-learned artificial neural network module which, when a design encoding vector that is an encoding vector of the design data and the text theme encoding vector are input as input data, outputs a text theme discrimination vector, which indicates a probability of similarity between the design encoding vector and the text theme encoding vector, as output data; and
    a UX-bit attribute discriminator that is a module used in the learning session of the design generation module and is a pre-learned artificial neural network module which, when the design encoding vector and an encoding vector of the UX-bit attribute are input as input data, outputs a UX-bit attribute discrimination vector, which indicates a probability of similarity between the design encoding vector and the encoding vector of the UX-bit attribute, as output data,
    wherein, in the learning session of the design generation module, parameters of the design generation module are updated in a direction in which a representative design loss, which is composed of a difference between the design data and web/app design reference data (ground truth) in which similarity with the image theme encoding vector and similarity with the text theme encoding vector are greater than or equal to a specific level in an encoding vector of a pre-stored web/app design corresponding thereto, an image theme discrimination loss comprising the image theme discrimination vector, a text theme discrimination loss comprising the text theme discrimination vector, and a UX-bit attribute determination loss comprising the UX-bit attribute discrimination are reduced.

2. The device of claim 1, further comprising a nonlinear network which is connected to the design generation module, and is a network having a nonlinear structure in which a plurality of fully connected (FC) layers are consecutively connected, wherein the nonlinear network receives a concatenated vector obtained by concatenating the image theme encoding vector and the text theme encoding vector as input data, and outputs a theme vector as output data, and wherein the nonlinear network is module which inputs the output theme vector to a plurality of layers in a network of the design generation module for each scale,
    wherein, in the design generation module, the UX-bit attribute is input as input data, and a noise vector is input to each layer having a scale to which the theme vector is input.

3. The device of claim 1, further comprising a common theme segment module which is connected to the image theme encoding module and is a module which receives the image theme data as input data and outputs common theme segment data as output data,
    wherein, in a learning session of the common theme segment module, parameters of the common theme segment module are updated in a direction in which similarity between the text theme encoding vector and the image theme encoding vector are increased.

4. The device of claim 1, wherein:
    the UX-bit attributes comprise UX-bit function attributes and UX-bit design attributes; and
    the UX-bit generation module comprises a UX element generation module that is a module which generates the plurality of the UX elements to match the UX-bit function attribute and the UX-bit design attribute with a specific UX element, and an recurrent neural network (RNN) module that is an artificial neural network module which outputs the UX-bit function attribute and the UX-bit design attribute for the UX element.

5. The device of claim 1, wherein:
    the UX-bit attributes comprise UX-bit function attributes and UX-bit design attributes; and
    the UX-bit generation module comprises a UX element generation module that is a module which generates the plurality of the UX elements to match the UX-bit function attribute and the UX-bit design attribute with a specific UX element, and an RNN module that is an artificial neural network module which outputs the UX-bit function attribute and the UX-bit design attribute for the UX element, wherein:
the RNN module comprises RNN blocks having a first RNN cell and a second RNN cell as a basic unit and the image theme encoding vector and the text theme encoding vector are used as initial input data;
the first RNN cell receives the initial input data or output data of a previous cell and RNN hidden layer information and outputs the UX-bit function attribute of an $n^{th}$ UX element; and
the second RNN cell receives the UX-bit function attribute, which is the output data of the previous cell, and the RNN hidden layer information, and outputs the UX-bit design attribute for the UX-bit function attribute of the $n^{th}$ UX element output from the first RNN cell.

6. The device of claim 1, wherein:
the UX-bit attributes comprise UX-bit function attributes and UX-bit design attributes; and
the UX-bit generation module comprises:
  a UX element generation module that is a module which generates the plurality of the UX elements to match the UX-bit function attribute and the UX-bit design attribute with a specific UX element;
  an RNN module that is an artificial neural network module which outputs the UX-bit function attribute and the UX-bit design attribute for the UX element; and
  a reinforcement learning module which is configured such that the UX-bit attributes of all pre-generated UX elements, the image theme encoding vector, and the text theme encoding vector are input as an environment, an RNN block of the RNN module is set as an agent, a situation, in which an $n^{th}$ UX element having the UX-bit function attributes and the UX-bit design attributes is virtually included in the UX-bit function attributes and the UX-bit design attributes of first to $(n-1)^{th}$ elements, is set as a state, wherein, in such a state, the UX-bit function attributes and the UX-bit design attributes output for the $n^{th}$ UX element by the RNN block, which is the agent, are input for an action, and as similarity is high between comparison information and the UX-bit function attributes and the UX-bit design attributes of the $n^{th}$ UX element which are output data, a relatively high reward is generated to update a hidden layer of the RNN block which is the agent,
wherein the comparison information indicates a concatenation between the image theme encoding vector and the text theme encoding vector.

7. An automatic design generating method, performed by the device according to claim 1, the method comprising:
an image theme encoding operation performed by an image theme encoding module that is a component of the automatic design generating artificial neural network device, the image theme encoding module receiving image theme data, which is an image representing a theme of a web/app graphic design to be generated by a practitioner, as input data, and outputting an image theme encoding vector as output data;
a text theme encoding operation performed by a text theme encoding module that is a component of the automatic design generating artificial neural network device, the text theme encoding module receiving text theme data, which is text representing the theme of the web/app graphic design to be generated by the practitioner, as input data, and outputting a text theme encoding vector as output data;
a UX-bit generating operation performed by a UX-bit generation module that is a component of the automatic design generating artificial neural network device, the UX-bit generation module receiving the image theme encoding vector and the text theme encoding vector as input data and outputting UX-bit attributes of a plurality of UX elements as output data; and
a design generating operation performed by a design generation module that is a component of the automatic design generating artificial neural network device, the design generation module receiving the image theme encoding vector, the text theme encoding vector, and the UX-bit attribute as input data and outputting design data indicating a specific web/app graphic design as output data,
wherein:
a learning session of the design generation module comprises:
an image theme discriminating operation performed by an image theme discriminator that is a component of the automatic design generating artificial neural network device, when the design data and the image theme data are input as input data, the image theme discriminator outputs an image theme discrimination vector, which indicates a probability of similarity between the design data and the image theme data, as output data,
a text theme discriminating operation performed by a text theme discriminator that is a component of the automatic design generating artificial neural network device, when a design encoding vector that is an encoding vector of the design data and the text theme encoding vector are input as input data, the text theme discriminator outputs a text theme discrimination vector, which indicates a probability of similarity between the design encoding vector and the text theme encoding vector, as output data, and
a UX-bit attribute discriminating operation performed by a UX-bit attribute discriminator that is a component of the automatic design generating artificial neural network device, when the design encoding vector and an encoding vector of the UX-bit attribute are input as input data, the UX-bit attribute discriminator outputs a UX-bit attribute discrimination vector, which indicates a probability of similarity between the design encoding vector and the encoding vector of the UX-bit attribute, as output data; and
in the learning session of the design generation module, parameters of the design generation module are updated in a direction in which a representative design loss, which is composed of a difference between the design data and web/app design reference data (ground truth) in which similarity with the image theme encoding vector and similarity with the text theme encoding vector are greater than or equal to a specific level in a pre-stored web/app design corresponding thereto, an image theme discrimination loss comprising the image theme discrimination vector, a text theme discrimination loss comprising the text theme discrimination vector, and a UX-bit attribute determination loss comprising the UX-bit attribute discrimination are reduced.

8. An automatic design generating artificial neural network system comprising:
a practitioner client which receives image theme data that is an image representing a theme of a web/app graphic design to be generated by a practitioner and text theme data that is text representing the theme to be generated by the practitioner from the practitioner; and the automatic design generating artificial neural network device using a UX-bit according to claim 1 which receives the image theme data and the text theme data from the practitioner client and outputs design data corresponding to the image theme data and the text theme data.

\* \* \* \* \*